United States Patent
Ofuji et al.

(10) Patent No.: US 8,520,608 B2
(45) Date of Patent: Aug. 27, 2013

(54) MOBILE COMMUNICATION SYSTEM

(75) Inventors: Yoshiaki Ofuji, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 714 days.

(21) Appl. No.: 12/305,144

(22) PCT Filed: Jun. 14, 2007

(86) PCT No.: PCT/JP2007/062058
§ 371 (c)(1),
(2), (4) Date: Apr. 13, 2009

(87) PCT Pub. No.: WO2007/148614
PCT Pub. Date: Dec. 27, 2007

(65) Prior Publication Data
US 2010/0027483 A1 Feb. 4, 2010

(30) Foreign Application Priority Data

Jun. 19, 2006 (JP) ................................. 2006-169459
Oct. 3, 2006 (JP) ................................. 2006-272342

(51) Int. Cl.
*H04W 4/00* (2009.01)
(52) U.S. Cl.
USPC ........................................................ 370/329
(58) Field of Classification Search
USPC ................. 370/344, 337, 347, 350, 208, 320, 370/328, 336, 341, 441, 329, 491; 375/150, 375/260, 130, 202, 231, 330, 326, 299, 296; 455/447, 63, 502, 449, 101, 67.6, 59, 65, 455/423, 226.1, 550.1, 561
See application file for complete search history.

(56) References Cited

U.S. PATENT DOCUMENTS

| | | | |
|---|---|---|---|
| 5,511,233 A * | 4/1996 | Otten | 455/524 |
| 6,038,455 A * | 3/2000 | Gardner et al. | 455/447 |
| 6,223,040 B1 * | 4/2001 | Dam | 455/447 |
| 6,452,962 B1 * | 9/2002 | Linsky et al. | 375/145 |
| 6,615,047 B1 * | 9/2003 | Yasooka et al. | 455/446 |
| 7,643,832 B2 * | 1/2010 | Cudak et al. | 455/450 |

(Continued)

FOREIGN PATENT DOCUMENTS

| | | |
|---|---|---|
| CN | 1261484 A | 7/2000 |
| JP | 5-102917 A | 4/1993 |

(Continued)

OTHER PUBLICATIONS

Office Action in Chinese Patent Application No. 2007800303479 mailed Oct. 25, 2010, with English translation thereof (10 pages).

(Continued)

*Primary Examiner* — Abdullah Riyami
(74) *Attorney, Agent, or Firm* — Osha Liang LLP

(57) ABSTRACT

A mobile communication system in which a finite number of reference signal sequences used for uplink channel estimation or the like are reused among multiple cells includes a determining unit configured to determine a frequency band used by user terminals to which a reference signal sequence with a predetermined sequence length is assigned in each of the cells within an interference area, wherein the frequency band is determined to be different from frequency bands used in the other cells.

8 Claims, 29 Drawing Sheets

(56) References Cited

U.S. PATENT DOCUMENTS

| | | | |
|---|---|---|---|
| 7,689,186 B2* | 3/2010 | Matoba et al. | 455/180.1 |
| 7,715,343 B2* | 5/2010 | Tomioka | 370/329 |
| 2002/0067712 A1* | 6/2002 | Bergkvist | 370/347 |
| 2003/0198281 A1* | 10/2003 | Grier et al. | 375/133 |
| 2005/0075125 A1* | 4/2005 | Bada et al. | 455/525 |
| 2006/0215611 A1* | 9/2006 | Nakagawa et al. | 370/332 |
| 2007/0165567 A1* | 7/2007 | Tan et al. | 370/329 |
| 2007/0183386 A1* | 8/2007 | Muharemovic et al. | 370/344 |
| 2007/0189404 A1* | 8/2007 | Baum et al. | 375/260 |
| 2007/0230600 A1* | 10/2007 | Bertrand et al. | 375/260 |
| 2007/0253465 A1* | 11/2007 | Muharemovic et al. | 375/130 |
| 2008/0063115 A1* | 3/2008 | Varadarajan et al. | 375/299 |
| 2008/0274727 A1* | 11/2008 | Axnas et al. | 455/423 |
| 2009/0052470 A1* | 2/2009 | Yun et al. | 370/491 |
| 2009/0110114 A1* | 4/2009 | Onggosanusi et al. | 375/299 |
| 2009/0175228 A1* | 7/2009 | Kimura et al. | 370/329 |

FOREIGN PATENT DOCUMENTS

| | | |
|---|---|---|
| JP | 2001-517047 A | 10/2001 |
| JP | 2002-505820 A | 2/2002 |
| JP | 2004-112590 A | 4/2004 |
| WO | WO 9732440 A1 * | 9/1997 |

OTHER PUBLICATIONS

Abstract, espacenet, in Chinese Publication No. 1261484 Publication date Jul. 26, 2000 (1 page).

Mexican Office Action for Mexican Patent Application No. MX/a/2008/016057, dated Jul. 29, 2010. (5 pages).

International Search Report w/translation from PCT/JP2007/062058 dated Sep. 18, 2007 (4 pages).

Written Opinion from PCT/JP2007/062058 dated Sep. 18, 2007 (3 pages).

3GPP TR25.813, V1.0.1; "Radio Interface Protocol Aspects (Release 7)"; Jun. 12, 2006 (39 pages).

\* cited by examiner

FIG.27
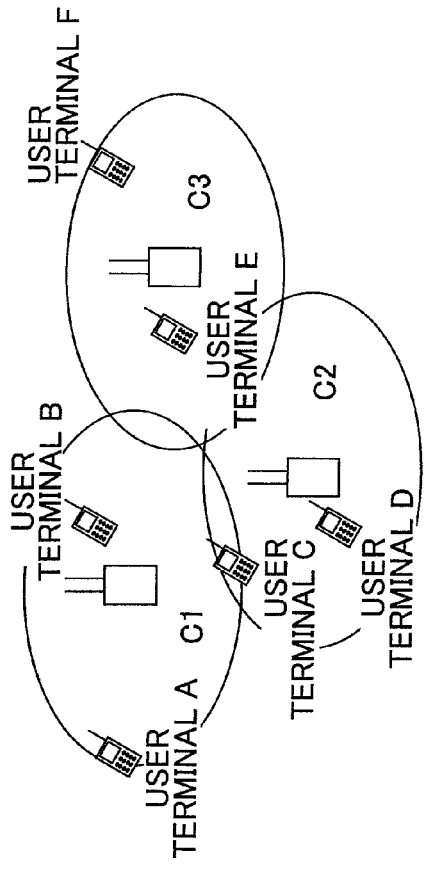
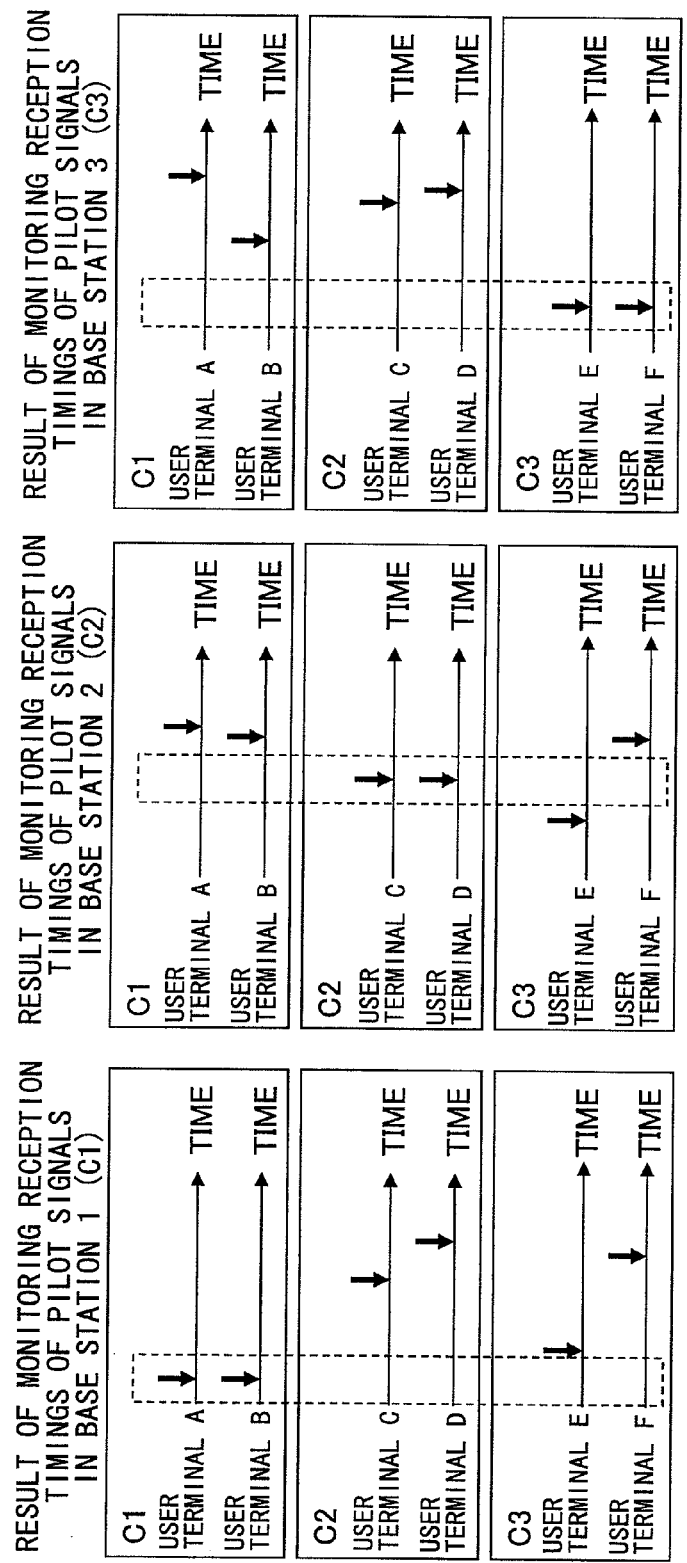

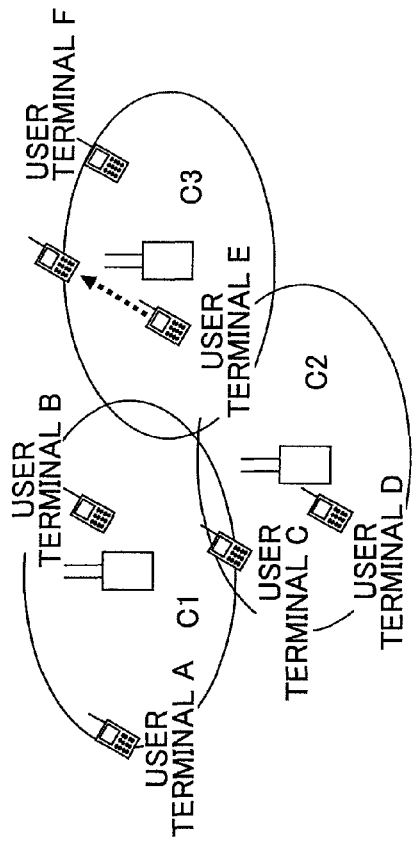
FIG.28
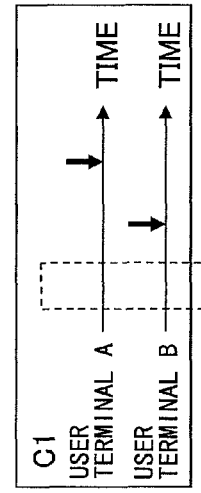
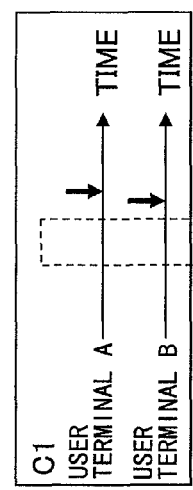
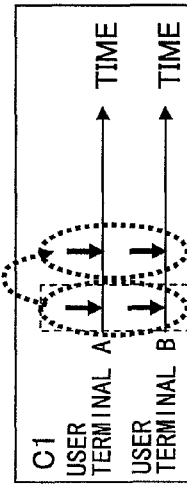
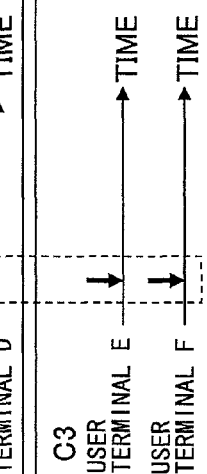
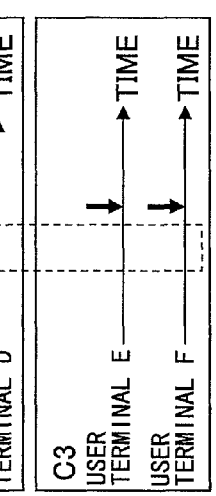
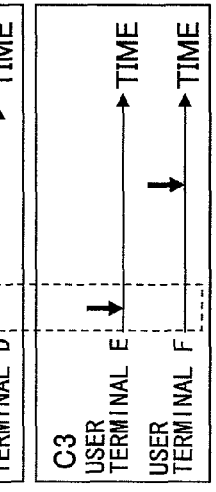

MOBILE COMMUNICATION SYSTEM

BACKGROUND OF THE INVENTION

1. Field of the Invention

The present invention relates to a mobile communication system for avoiding collision among RSs (Reference Signals).

2. Description of the Related Art

In view of limitations of transmission power in a user terminal, an SC-FDMA (Single Carrier Frequency Division Multiple Access) scheme is proposed for an uplink radio access scheme in E-UTRA (Evolved UMTS (Universal Mobile Telecommunications System) Terrestrial Radio Access) standardized by 3GPP (3rd Generation Partnership Project), in order to reduce PAPR (Peak to Average Power Ratio) and to improve the efficiency of the transmitting amplifier (see "3GPP TR 25.813" V1.0.1 (2006-06), 3GPP Organizational Partners (ARIB, ATIS, CCSA, ETSI, TTA, TTC), for example). FIG. 1 shows an example of uplink frequency allocation in an SC-FDMA radio access scheme. In FIG. 1, signals for four user terminals UE1-UE4 are allocated on the frequency axis. It should be noted that a frequency band used by each user terminal UE1-UE4 changes according to a channel condition or the like.

Regarding an uplink subframe configuration in the SC-FDMA radio access scheme, it is proposed that SC-FDMA symbols for RSs and SC-FDMA symbols for data signals be multiplexed according to TDM (Time Division Multiplexing). FIG. 2 shows an example of an uplink subframe format in the SC-FDMA radio access scheme. In FIG. 2, fourteen SC-FDMA symbols (symbols #0-#13) are placed with each gap CP (Cyclic Prefix) placed therebetween. RSs are transmitted from each user terminal at the timings of the symbols #0, #3, and #10.

Regarding an RS sequence used for channel estimation during synchronous detection and/or for reception quality measurement, it is proposed that a CAZAC (Constant Amplitude Zero Auto Correlation) sequence be used in order to improve the accuracy of channel estimation due to good autocorrelation properties. The use of different CAZAC codes among cells can reduce interference from other cells. In addition, the use of the same CAZAC sequence with a cyclic shift in user terminals which use the same frequency band in the same cell can orthogonalize signals transmitted from user terminals.

In addition, the SC-FDMA radio access scheme can increase the coverage by narrowing the transmission bandwidth and increasing signal power density of the transmission bandwidth. In other words, the SC-FDMA radio access scheme can increase the range of transmission signals.

SUMMARY OF THE INVENTION

Problem(s) to be Solved by the Invention

On the other hand, the number of sequences per one CAZAC code is limited to N−1 in the case of the sequence length of N. For this reason, when SC-FDMA symbols for RSs and SC-FDMA symbols for data signals are multiplexed according to TDM (shown in FIG. 2) as proposed in the E-UTRA uplink, there is a problem in that the sequence length of the RS cannot be long, and thus the number of sequences cannot be large.

In addition, narrowing the transmission bandwidth in order to increase the coverage causes a lower symbol rate, which makes the sequence length of the RS shorter and the number of CAZAC sequences smaller.

In this case, the frequency of repeatedly assigning (reusing) the same CAZAC sequence to each cell becomes higher, which increases the probability that signals using the same CAZAC sequence come into collision among cells and degrades communication quality. FIG. 3 shows an example of reusing the CAZAC sequences among cells (three-cell reuse). In FIG. 3, #1-#3 represent CAZAC sequences. It should be noted that multiple CAZAC sequences with the sequence lengths determined according to the respective frequency bands are provided in advance, and that one of the CAZAC sequences is assigned according to the frequency band.

Although CAZAC sequences used in the neighboring cells are mutually different in FIG. 3, the same CAZAC sequence is assigned to cells within not-too-distant areas, which causes interference due to collision among RSs. For example, transmission signals from a user terminal UE1 which is located in a cell C1 centered at a base station BS1 may cause interference with transmission signals from a user terminal UE2 which is located in a cell C2 centered at a base station BS2.

Although the aforementioned example focuses on both the radio subframe configuration where SC-FDMA symbols for RSs and SC-FDMA symbols for data signals are multiplexed according to TDM and the RS sequence using the CAZAC code, a similar problem may arise in other situations.

In view of the aforementioned problem in the related art, provided that the finite number of RS sequences used for uplink channel estimation or the like are reused among multiple cells, it is a general object of the present invention to provide a mobile communication system which can avoid collision among RSs and prevent communication quality from being degraded, even though the number of RS sequences is small.

Means for Solving the Problem

In one aspect of the present invention, in order to solve the aforementioned problem, there is provided a mobile communication system in which a finite number of reference signal sequences used for uplink channel estimation or the like are reused among multiple cells, including:

a determining unit configured to determine a frequency band used by user terminals to which a reference signal sequence with a predetermined sequence length is assigned in each of the cells within an interference area, wherein the frequency band is determined to be different from frequency bands used in the other cells.

In the mobile communication system, for all the cells within the interference area, the frequency band may be different from frequency bands used in all the other cells within the interference area.

In the mobile communication system, for each of the cells to which the same reference signal sequence is assigned within the interference area, the frequency band may be different from frequency bands used in the other cells to which the same reference signal sequence is assigned within the interference area.

In the mobile communication system, the frequency band used in each of the cells may be semi-statically determined slowly.

In the mobile communication system, the frequency band used in each of the cells may be dynamically determined at each subframe.

In the mobile communication system, the frequency band used in each of the cells may be determined based on information signaling to and from the other cells.

In the mobile communication system, the frequency band used in each of the cells may be autonomously determined without information signaling to and from the other cells.

In the mobile communication system, the frequency band used in each of the cells may be semi-statically determined slowly, the frequency band used in each of the cells may be determined based on information signaling to and from the other cells, and the frequency band may be selected by sharing frequency bands used or unused in the respective cells by means of the signaling.

In the mobile communication system, the frequency band used in each of the cells may be semi-statically determined slowly, the frequency band used in each of the cells may be determined based on information signaling to and from the other cells, and the frequency band may be selected by sharing priorities for using frequency bands in the respective cells by means of the signaling.

In another aspect of the present invention, there is provided a mobile communication system in which a finite number of reference signal sequences used for uplink channel estimation or the like are reused among multiple cells, including:

a changing unit configured to autonomously change to another of the reference signal sequences which does not cause interference, upon detecting interference from another of the cells to which the same reference signal sequence is assigned.

In another aspect of the present invention, there is provided a mobile communication system in which a finite number of reference signal sequences used for uplink channel estimation or the like are reused among multiple cells, including:

a determining unit configured to randomly determine a frequency band or a reference signal sequence used by user terminals to which one of the reference signal sequences with a predetermined sequence length is assigned in each of the cells within an interference area.

In another aspect of the present invention, there is provided a mobile communication system in which a finite number of reference signal sequences used for uplink channel estimation or the like are reused among multiple cells, including:

a shifting unit configured to shift transmission timings of radio subframes in each of the cells within an interference area.

The mobile communication system may further include a detecting unit configured to detect collision between a reception timing of a reference signal within an own-cell and a reception timing of another reference signal received from another of the cells, and the shifting unit may shift the transmission timings when the collision is detected.

The mobile communication system may further include a transmitting unit configured to transmit information about the shifted transmission timings to the other cell.

The shifting unit may shift the transmission timings in consideration of control delay when the collision is detected.

In the mobile communication system, information about the shifted transmission timings may be included in control bits used for synchronizing reception timings of uplink signals from user terminals in the cell.

Effect of the Invention

According to an embodiment of the present invention, a mobile communication system in which a finite number of reference signal sequences used for uplink channel estimation or the like are reused among multiple cells can avoid collision among reference signals and prevent communication quality from being degraded, even though the number of reference signal sequences is small, by any of the following approaches:

(1) an approach for determining a frequency band used by user terminals to which a reference signal sequence with a predetermined sequence length is assigned in each cell within an interference area, wherein the frequency band is determined to be different from frequency bands used in other cells;

(2) an approach for autonomously changing to another reference signal sequence which does not cause interference, upon detecting interference from other cells to which the same reference signal sequence is assigned;

(3) an approach for randomly determining a frequency band or a reference signal sequence used by user terminals to which a reference signal sequence with a predetermined sequence length is assigned in each cell within an interference area; and (4) an approach for shifting transmission timings of radio subframes in each cell within an interference area.

BRIEF DESCRIPTION OF THE DRAWINGS

FIG. 27 shows results of detecting reception timings of RSs transmitted from other base stations.

FIG. 28 shows interference due to movement of a user terminal in the example of FIG. 27.

DESCRIPTION OF THE PREFERRED EMBODIMENTS

Figure 1:
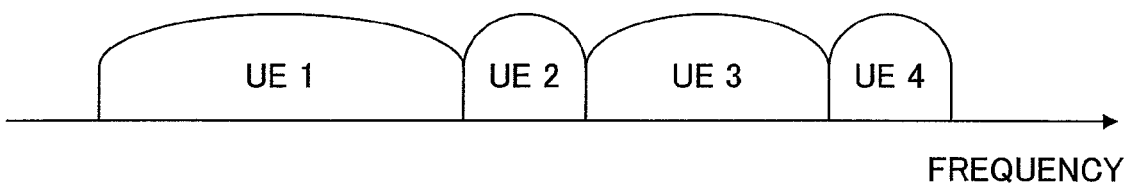
FIG. 1 shows an example of uplink frequency allocation in an SC-FDMA radio access scheme.

[Description of Notations]
C1-C4, X-Z cell
UE, UE1-UE4 user terminal
CS control station
101 frequency band determining unit
102 frequency band information storing unit
103 control signal generating unit
111 frequency band priority determining unit
112 frequency band priority information storing unit
113 control signal generating unit
121 scheduler
122 control signal generating unit
131 frequency hopping pattern determining unit
132 frequency hopping pattern storing unit
133 code changing pattern determining unit
134 code changing pattern storing unit
135 control signal generating unit
141 timing determining unit
BS, BS1-BS3 base station
201 radio resource allocating unit
202 receiving unit
203 transmitting unit
204 control information receiving unit
205 channel condition measuring unit
206 scheduler
207 control signal generating unit
211 radio resource allocating unit
212 receiving unit
213 transmitting unit
214 channel condition measuring unit
215 interference power measuring unit
216 scheduler
217 control signal generating unit
221 radio resource allocating unit
222 receiving unit
223 transmitting unit
224 channel condition measuring unit
225 control signal generating unit
226 control signal receiving unit
227 control signal generating unit
231 radio resource allocating unit
232 receiving unit
233 transmitting unit
234 control information receiving unit
235 channel condition receiving unit
236 scheduler
237 control signal generating unit
241 radio resource allocating unit
242 receiving unit
243 transmitting unit
244 frequency band determining unit
245 code determining unit
246 channel condition measuring unit
247 scheduler
248 control signal generating unit
251 collision detecting unit
252 transmission timing control unit
261 collision detecting unit
262 transmission timing control unit
263 information exchanging unit
CP gap
symbols #0-#2, #4-#9, #11-#13 data signal
symbols #3, #10 RS
P1 sounding RS
P2 RS for channel estimation
a-c curve (channel estimation)

[Best Mode of Carrying Out The Invention]

Figure 2:
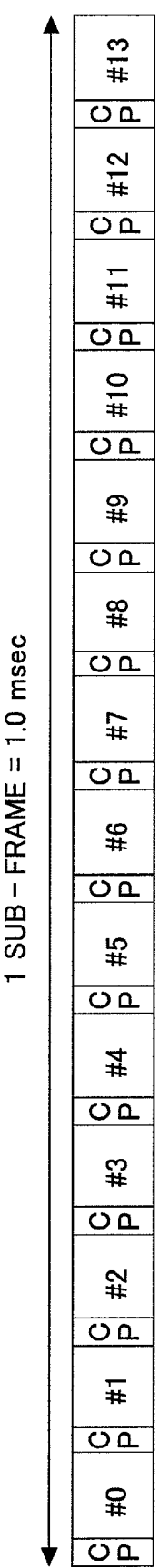
FIG. 2 shows an example of an uplink subframe format in the SC-FDMA radio access scheme.
Figure 3:
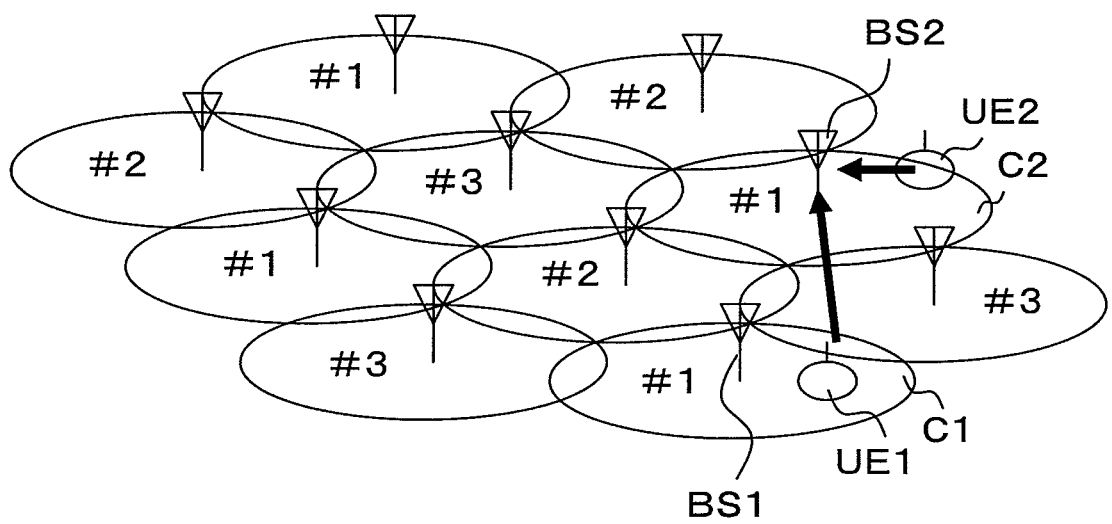
FIG. 3 shows an example of reusing the CAZAC sequences among cells (three-cell reuse).

Preferred embodiments of the present invention are described below. It is assumed that a mobile communication system employs both the SC-FDMA radio access scheme described with reference to FIGS. 1-3 and the radio subframe configuration in which SC-FDMA symbols for RSs and SC-FDMA symbols for data signals are multiplexed according to TDM. It is also assumed that the mobile communication system uses a CAZAC sequence as an RS sequence.

[Approach for Determining A Frequency Band Used by User Terminals to which a CAZAC Sequence with a Predetermined Sequence Length is Assigned in Each Cell within an Interference Area, Wherein the Frequency Band is Determined to be Different from Frequency Bands Used in Other Cells]

This approach changes frequency bands used by user terminals to which a CAZAC sequence with a predetermined sequence length is assigned in each cell to avoid other-cell interference (fractional inter-cell frequency reuse).

This approach includes the case where, for all the cells within the interference area, the frequency band is determined to be different from frequency bands used in all the other cells within the interference area. This approach also includes the case where, for each of the cells to which the same CAZAC sequence is assigned within the interference area, the frequency band is determined to be different from frequency bands used in other cells to which the same CAZAC sequence is assigned within the interference area.

This approach includes, for each of the aforementioned cases, the case where the frequency band used in each of the cells is semi-statically determined slowly. This approach also includes, for each of the aforementioned cases, the case where the frequency band used in each of the cells is dynamically determined at each subframe.

This approach includes, for each of the aforementioned cases, the case where the frequency band used in each of the cells is determined based on information signaling to and from the other cells. This approach also includes, for each of the aforementioned cases, the case where the frequency band used in each of the cells is autonomously determined without information signaling to and from the other cells.

In the case where the frequency band used in each of the cells is semi-statically determined slowly and the frequency band used in each of the cells is determined based on information signaling to and from the other cells, this approach includes the case where the frequency band is selected by sharing frequency bands used or unused in the respective cells by means of the signaling. In that case, this approach also includes the case where the frequency band is selected by sharing priorities for using frequency bands in the respective cells by means of the signaling.

The aforementioned cases are summarized below.

(1) The frequency band is determined for all the cells/semi-statically/with signaling/by sharing used or unused frequency bands.

(2) The frequency band is determined for all the cells/semi-statically/with signaling/by sharing priorities for using frequency bands.

(3) The frequency band is determined for all the cells/semi-statically/without signaling.

(4) The frequency band is determined for all the cells/dynamically/with signaling.

(5) The frequency band is determined for all the cells/dynamically/without signaling.

(6) The frequency band is determined for each cell to which the same sequence is assigned/semi-statically/with signaling/by sharing used or unused frequency bands.

(7) The frequency band is determined for each cell to which the same sequence is assigned/semi-statically/with signaling/by sharing priorities for using frequency bands.

(8) The frequency band is determined for each cell to which the same sequence is assigned/semi-statically/without signaling.

(9) The frequency band is determined for each cell to which the same sequence is assigned/dynamically/with signaling.

(10) The frequency band is determined for each cell to which the same sequence is assigned/dynamically/without signaling.

Each of these cases is described below with reference to the accompanying drawings.

Figure 4:
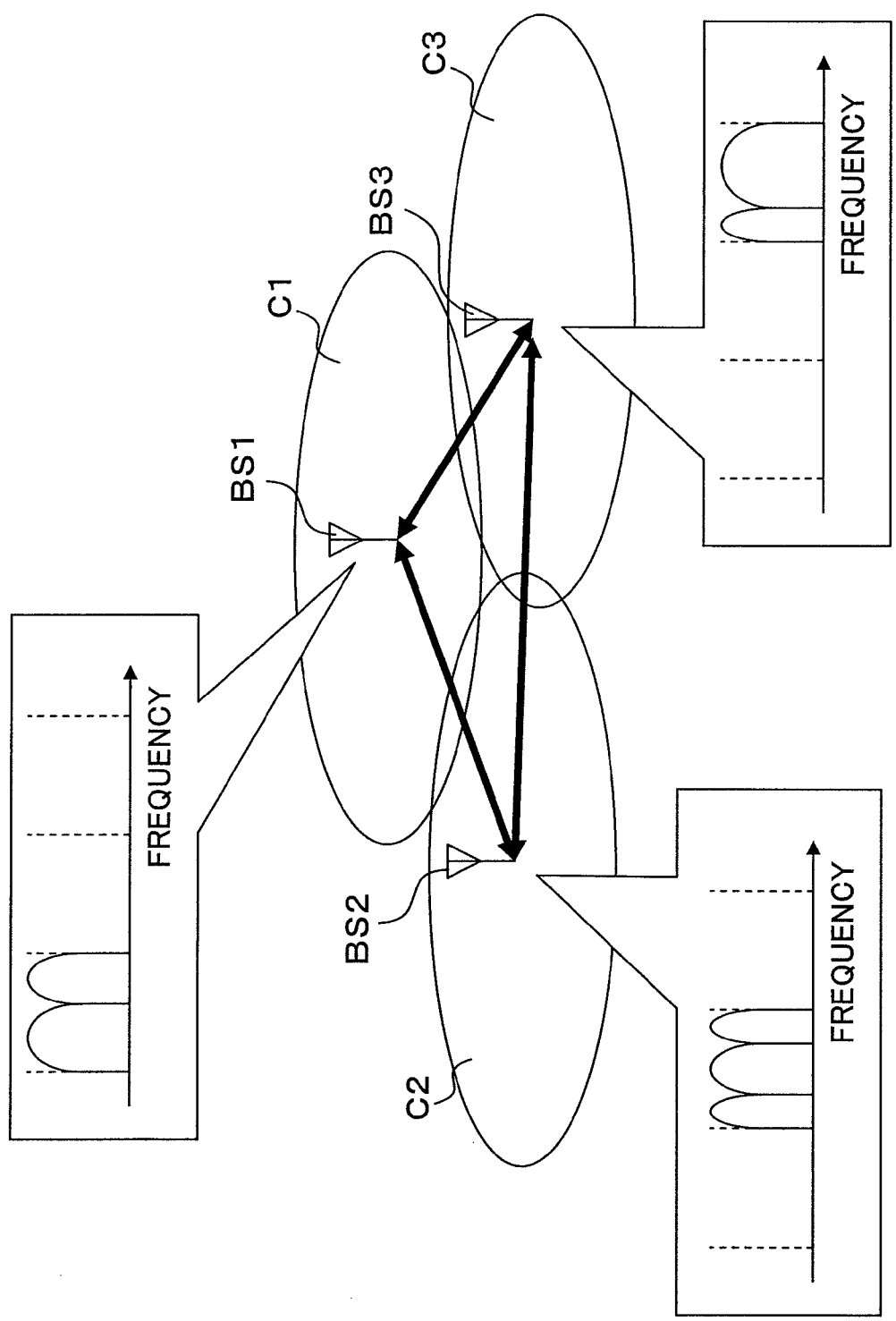
FIG. 4 shows an example of selecting a frequency band by semi-statically sharing frequency bands used or unused in all cells within an interference area by means of signaling.

FIG. 4 corresponds to the case (1) and shows an example of selecting a frequency band by semi-statically sharing frequency bands used or unused in all cells within an interference area by means of signaling. The frequency bands used or unused in the respective cells are shared by means of signaling among the cell C1 centered at the base station BS1, the cell C2 centered at the base station BS2, and the cell C3 centered at the base station BS3. Then, the frequency bands used in the respective cells are determined so as not to overlap one another.

Figure 5:
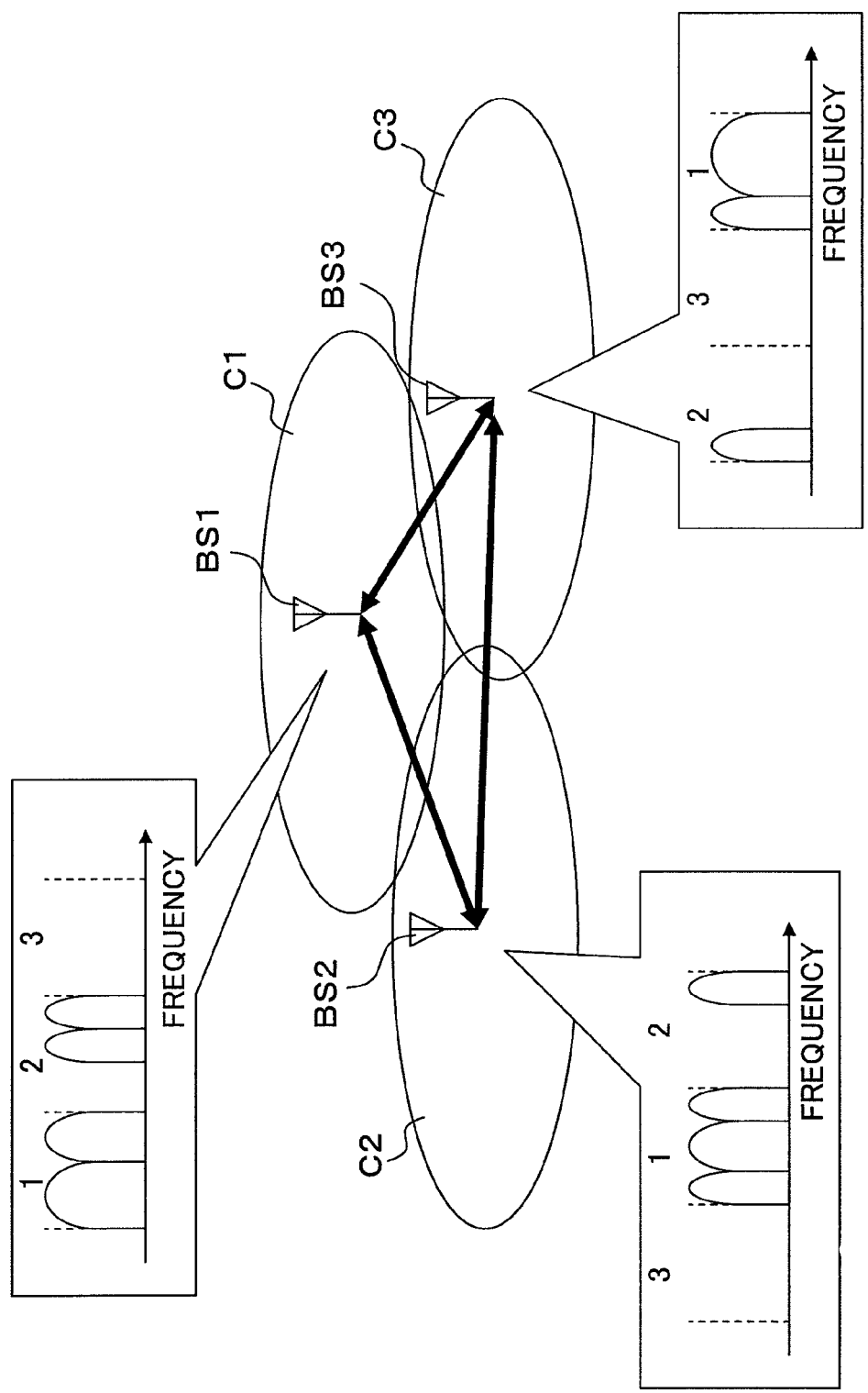
FIG. 5 shows an example of selecting a frequency band by semi-statically sharing priorities for using frequency bands in all cells within an interference area by means of signaling.

FIG. 5 corresponds to the case (2) and shows an example of selecting a frequency band by semi-statically sharing priorities for using frequency bands in all cells within an interference area by means of signaling. The priorities for using frequency bands in the respective cells are shared by means of signaling among the cell C1 centered at the base station BS1, the cell C2 centered at the base station BS2, and the cell C3 centered at the base station BS3. Then, the frequency bands used in the respective cells are determined so as not to overlap one another as much as possible. The numbers above the frequency bands represent priorities, among which "1" is the highest priority.

Figure 6:
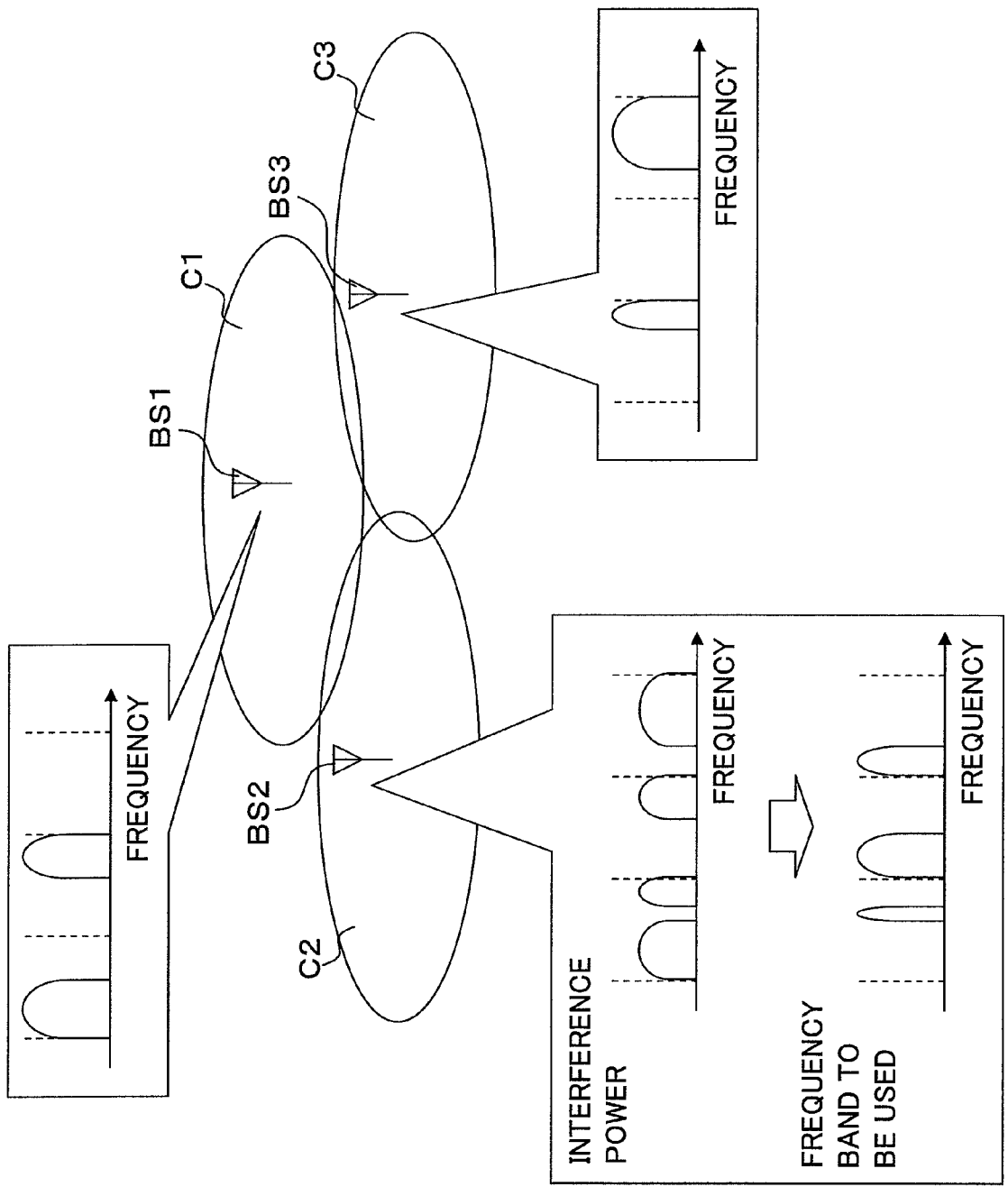
FIG. 6 shows an example of semi-statically or dynamically selecting frequency bands used in all cells within an interference area based on measurement of other-cell interference without signaling.

FIG. 6 corresponds to the cases (3) and (5) and shows an example of semi-statically or dynamically selecting frequency bands used in all cells within an interference area based on measurement of other-cell interference without signaling. The other-cell interference (interference power) for each frequency band is measured in the cell C1 centered at the base station BS1, the cell C2 centered at the base station BS2, and the cell C3 centered at the base station BS3. Then, the frequency bands used in the respective cells are autonomously determined so as not to use frequency bands which are expected to be used in other cells. The case (3) differs from the case (5) in terms of the time interval of measuring other-cell interference and controlling the frequency bands based on the measurement. In the case (3), the frequency bands are controlled based on an average measured value within a predetermined time interval. In the case (5), on the contrary, the frequency bands are controlled at each subframe based on an instantaneous measured value.

Figure 7:
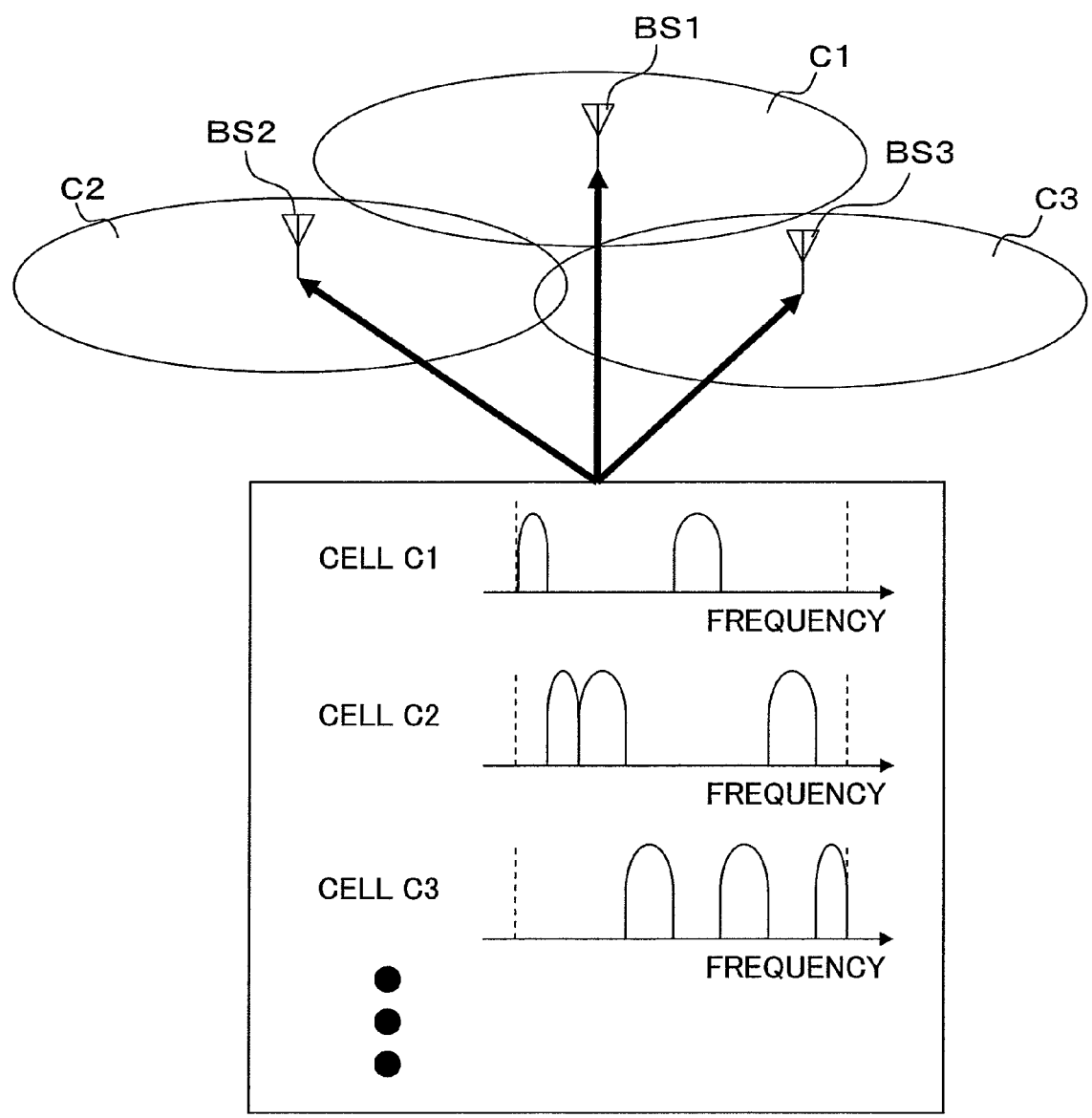
FIG. 7 shows an example of dynamically and centrally allocating frequency bands used in all cells within an interference area by means of signaling.

FIG. 7 corresponds to the case (4) and shows an example of dynamically and centrally allocating frequency bands used in all cells within an interference area by means of signaling. The frequency bands are centrally allocated (scheduled) to the cell C1 centered at the base station BS1, the cell C2 centered at the base station BS2, and the cell C3 centered at the base station BS3. Then, the frequency bands used in the respective cells are determined so as not to overlap one another.

Figure 8:
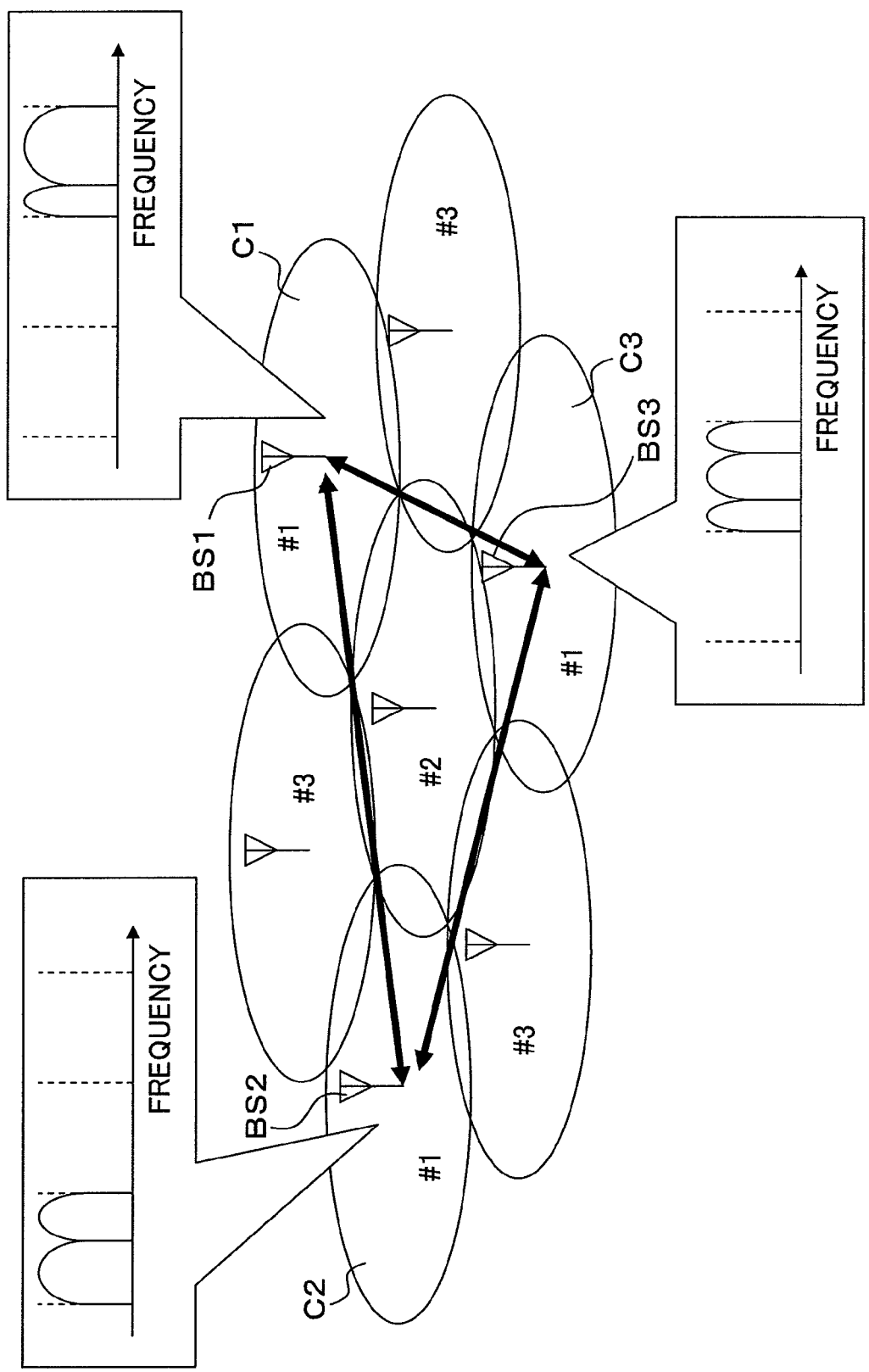
FIG. 8 shows an example of selecting a frequency band by semi-statically sharing frequency bands used or unused in cells with the same CAZAC sequence within an interference area by means of signaling.

FIG. 8 corresponds to the case (6) and shows an example of selecting a frequency band by semi-statically sharing frequency bands used or unused in cells with the same CAZAC sequence within an interference area by means of signaling. The frequency bands used or unused in the respective cells are shared by means of signaling among the cell C1 centered at the base station BS1, the cell C2 centered at the base station BS2, and the cell C3 centered at the base station BS3. In this example, the same CAZAC sequence is assigned to the cells C1, C2, and C3. Then, the frequency bands used in the respective cells are determined so as not to overlap one another. The frequency bands are determined similarly for another CAZAC sequence.

Figure 9:
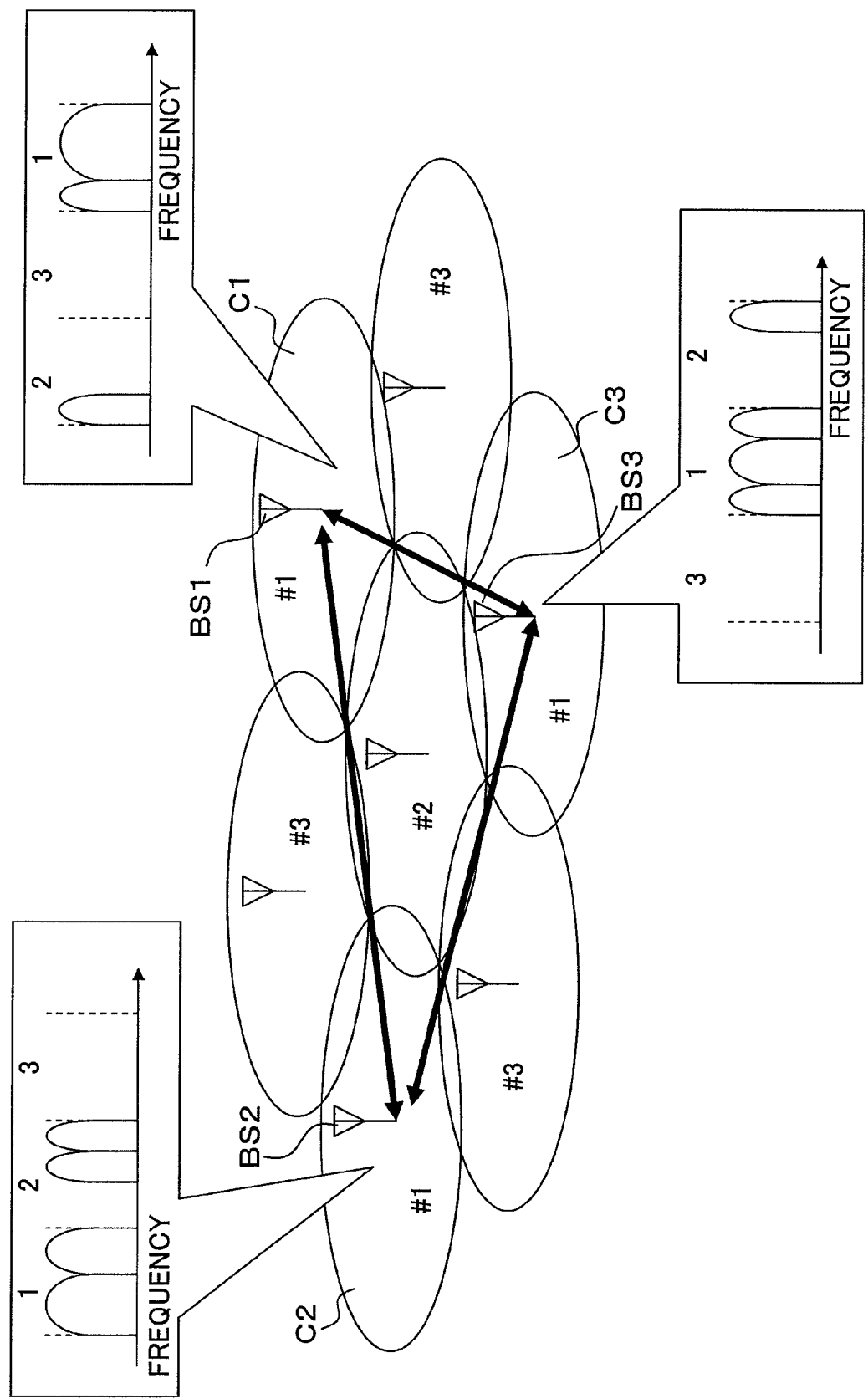
FIG. 9 shows an example of selecting a frequency band by semi-statically sharing priorities for using frequency bands in cells with the same CAZAC sequence within an interference area by means of signaling.

FIG. 9 corresponds to the case (7) and shows an example of selecting a frequency band by semi-statically sharing priorities for using frequency bands in cells with the same CAZAC sequence within an interference area by means of signaling. The priorities for using frequency bands in the respective cells are shared by means of signaling among the cell C1 centered at the base station BS1, the cell C2 centered at the base station BS2, and the cell C3 centered at the base station BS3. In this example, the same CAZAC sequence is assigned to the cells C1, C2, and C3. Then, the frequency bands used in the respective cells are determined so as not to overlap one another as much as possible. The numbers above the frequency bands represent priorities, among which "1" is the highest priority. The frequency bands are determined similarly for another CAZAC sequence.

Figure 10:
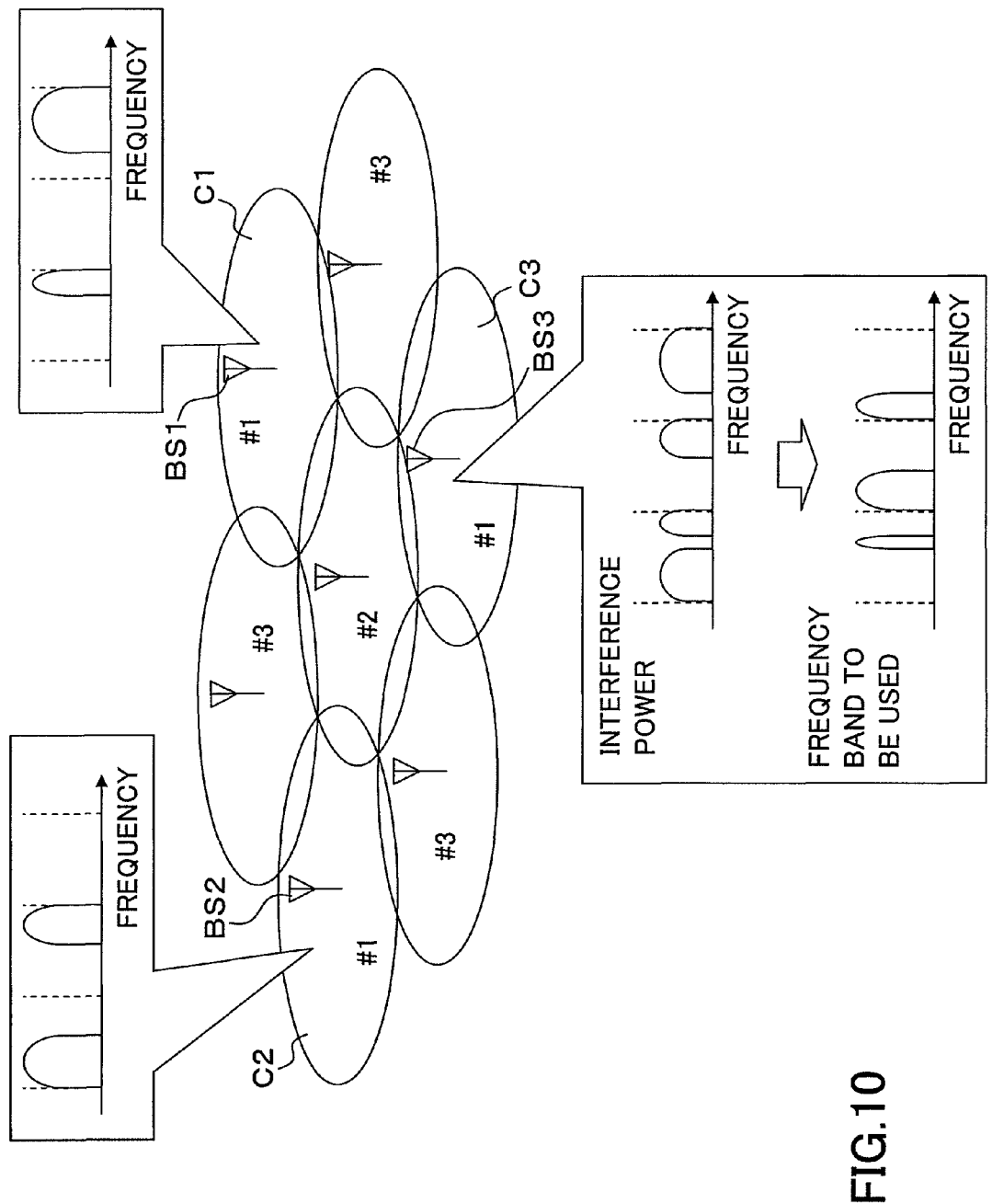
FIG. 10 shows an example of semi-statically or dynamically selecting frequency bands used in cells with the same CAZAC sequence within an interference area based on measurement of other-cell interference without signaling.

FIG. 10 corresponds to the cases (8) and (10) and shows an example of semi-statically or dynamically selecting frequency bands used in cells with the same CAZAC sequence within an interference area based on measurement of other-cell interference without signaling. The other-cell interference (interference power) for each frequency band is measured in the cell C1 centered at the base station BS1, the cell C2 centered at the base station BS2, and the cell C3 centered at the base station BS3. In this example, the same CAZAC sequence is assigned to the cells C1, C2, and C3. Then, the frequency bands used in the respective cells are autonomously determined so as not to use frequency bands which are expected to be used in other cells with the same CAZAC sequence. The case (8) differs from the case (10) in terms of the time interval of measuring other-cell interference and controlling the frequency bands based on the measurement. In the case (8), the frequency bands are controlled based on an average measured value within a predetermined time interval. In the case (10), on the contrary, the frequency bands are controlled at each subframe based on an instantaneous measured value. The frequency bands are determined similarly for another CAZAC sequence.

Figure 11:
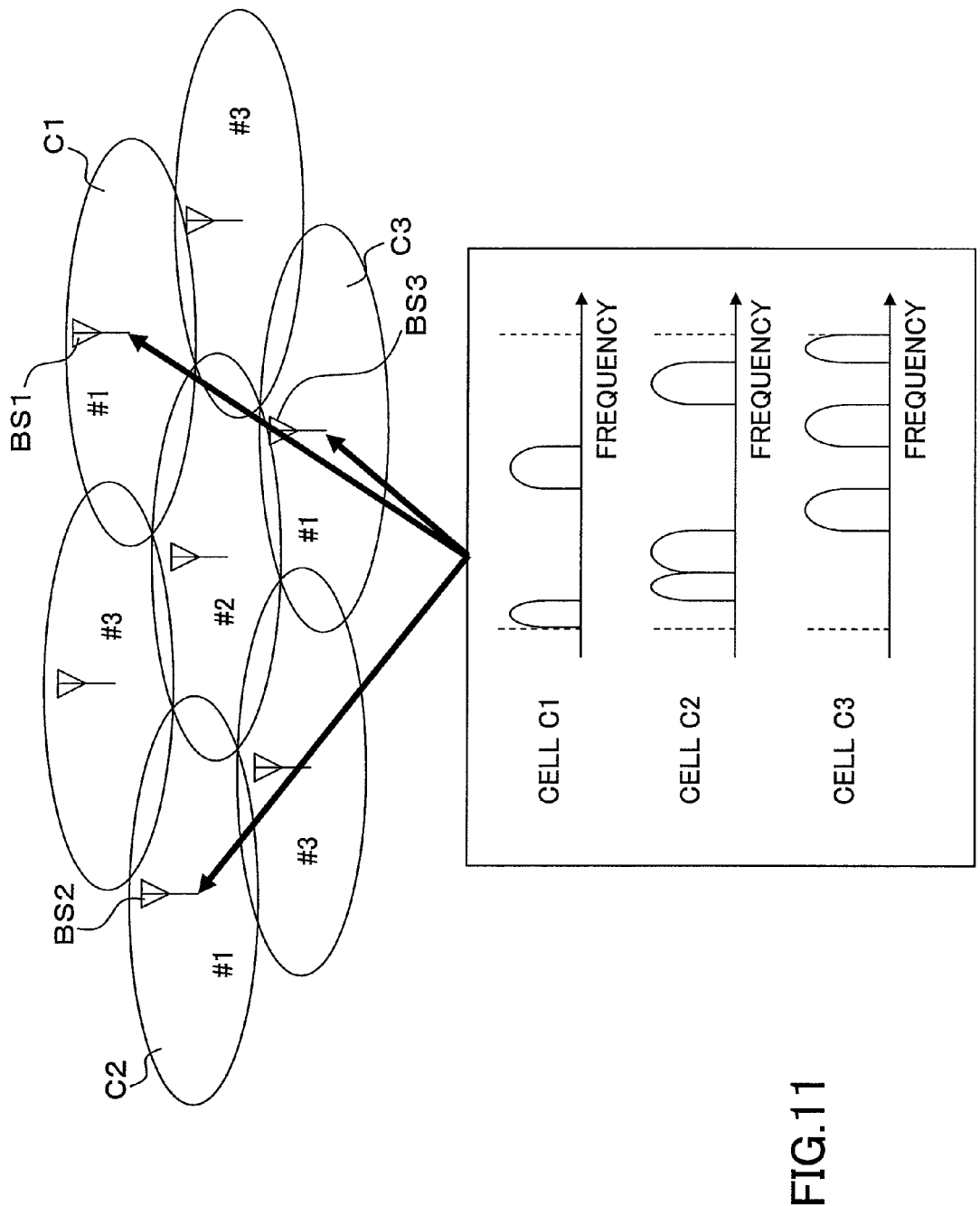
FIG. 11 shows an example of dynamically and centrally allocating frequency bands used in cells with the same CAZAC sequence within an interference area by means of signaling.

FIG. 11 corresponds to the case (9) and shows an example of dynamically and centrally allocating frequency bands used in cells with the same CAZAC sequence within an interference area by means of signaling. The frequency bands are centrally allocated (scheduled) to the cell C1 centered at the base station BS1, the cell C2 centered at the base station BS2, and the cell C3 centered at the base station BS3. In this example, the same CAZAC sequence is assigned to the cells C1, C2, and C3. Then, the frequency bands used in the respective cells are determined so as not to overlap one another. The frequency bands are determined similarly for another CAZAC sequence.

Structures for implementing this approach are described below.

Figure 12:
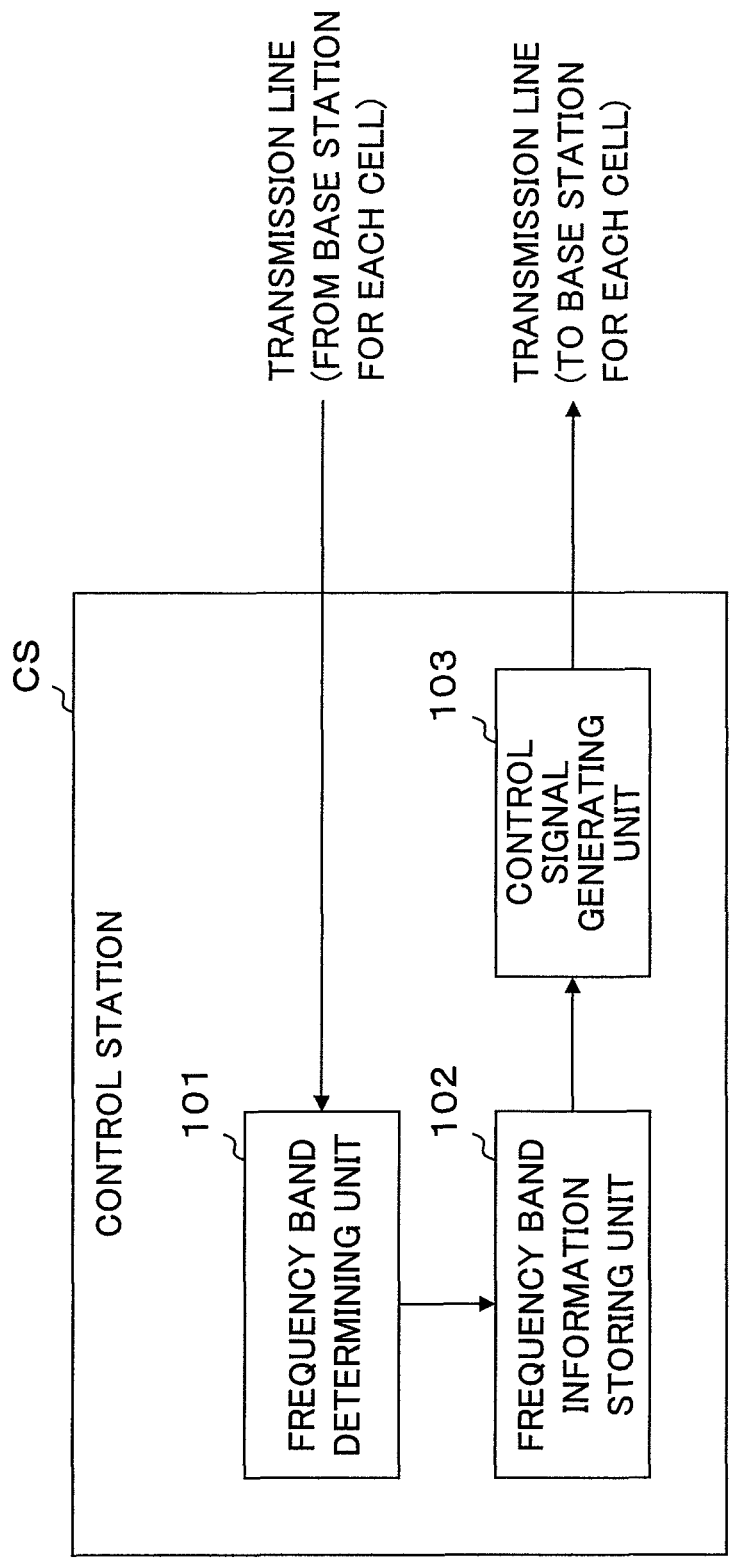
FIG. 12 shows an example structure of a control station for managing frequency bands used or unused in the respective cells in the example of FIG. 4 or 8.

FIG. 12 an example structure of a control station CS for managing frequency bands used or unused in the respective cells in the example of FIG. 4 or 8. The control station CS includes a frequency band determining unit 101, a frequency band information storing unit 102, and a control signal generating unit 103. The frequency band determining unit 101 retrieves information about each cell, such as the amount of traffic, from a base station for each cell via a transmission line and determines a frequency band to be used. The frequency band information storing unit 102 stores the frequency band determined by the frequency band determining unit 101. The control signal generating unit 103 generates a control signal based on the frequency band stored in the frequency band information storing unit 102 and transmits the control signal to the base station for each cell via the transmission line.

Figure 13:
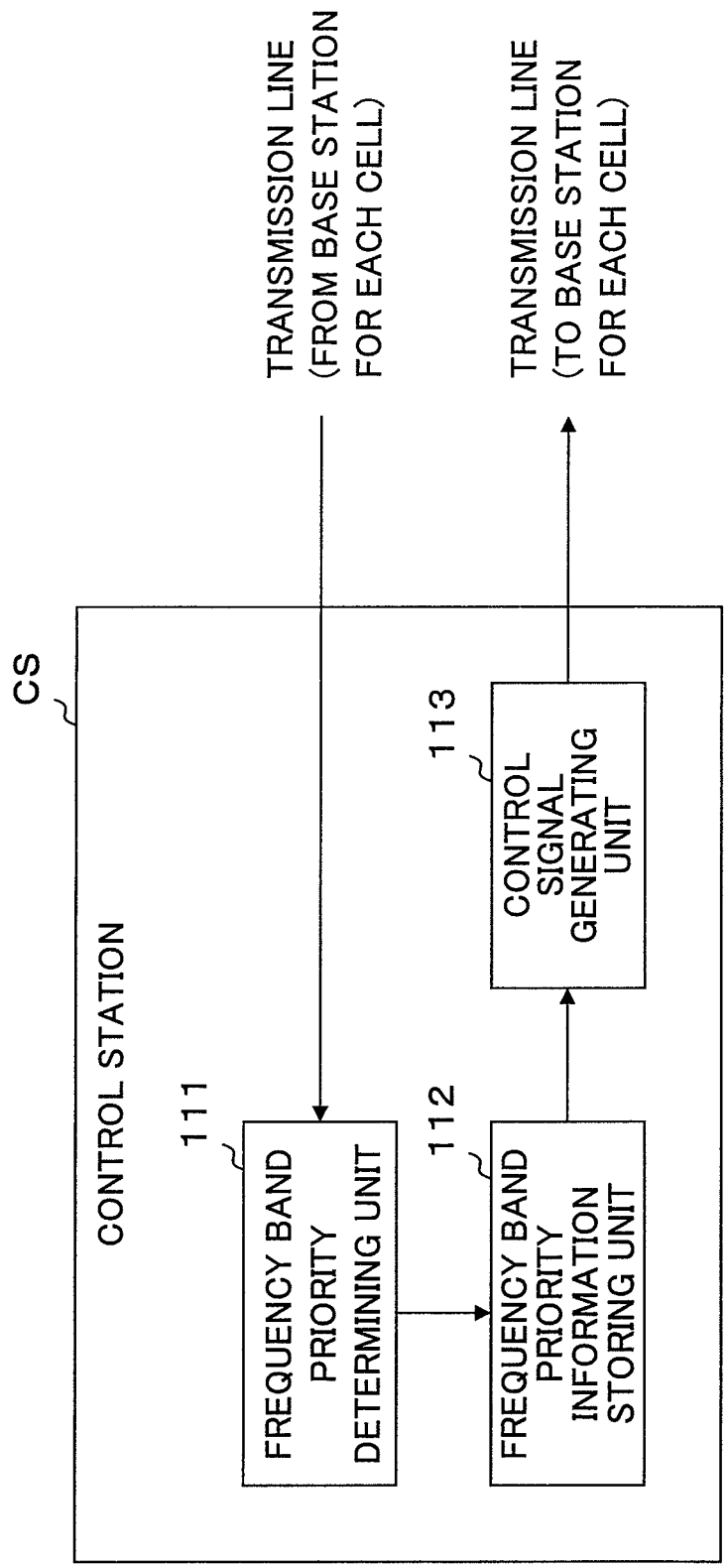
FIG. 13 shows an example structure of a control station for managing priorities for using frequency bands in the respective cells in the example of FIG. 5 or 9.

FIG. 13 shows an example structure of a control station CS for managing priorities for using frequency bands in the respective cells in the example of FIG. 5 or 9. The control station CS includes a frequency band priority determining unit 111, a frequency band priority information storing unit 112, and a control signal generating unit 113. The frequency band priority determining unit 111 retrieves information about each cell, such as the amount of traffic, from a base station for each cell via a transmission line and determines priorities for using frequency bands. The frequency band priority information storing unit 112 stores the priorities determined by the frequency band determining unit 111. The control signal generating unit 113 generates a control signal based on the priorities stored in the frequency band priority information storing unit 112 and transmits the control signal to the base station for each cell via the transmission line.

Figure 14:
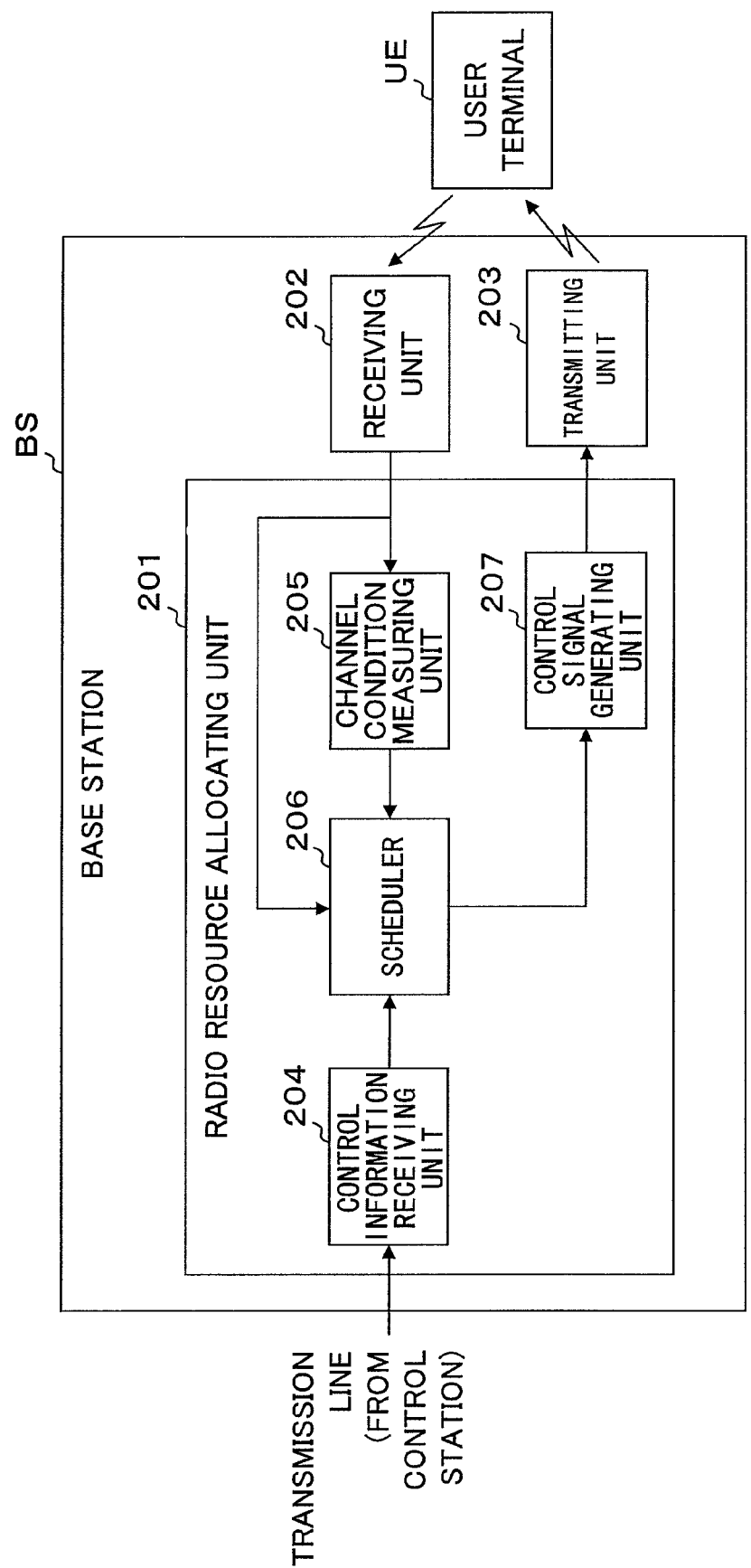
FIG. 14 shows an example structure of a base station in the example of FIG. 4, 5, 8, or 9.

FIG. 14 shows an example structure of a base station BS in the example of FIG. 4, 5, 8, or 9. The base station BS includes a radio resource allocating unit 201, a receiving unit 202, and a transmitting unit 203. The radio resource allocating unit 201 receives a control signal from a control station via a transmission line and allocates radio resources. The receiving unit 202 receives signals from a user terminal UE. The transmitting unit 203 transmits signals to the user terminal UE. The radio resource allocating unit 201 includes a control information receiving unit 204, a channel condition measuring unit 205, a scheduler 206, and a control signal generating unit 207. The control information receiving unit 204 receives the control signal (information about a frequency band to be used or information about priorities) from the control station via the transmission line. The channel condition measuring unit 205 measures a channel condition between the user terminal UE and the base station BS based on signals received by the receiving unit 202. The scheduler 206 schedules radio resources based on the control signal received by the control information receiving unit 204, information (traffic information such as traffic type or the amount of data) retrieved by the receiving unit 202, and the channel condition measured by the channel condition measuring unit 205. The control signal generating unit 207 generates a control signal regarding uplink radio resource allocation based on the result of scheduling in the scheduler 206 and supplies the control signal to the transmitting unit 203.

Figure 15:
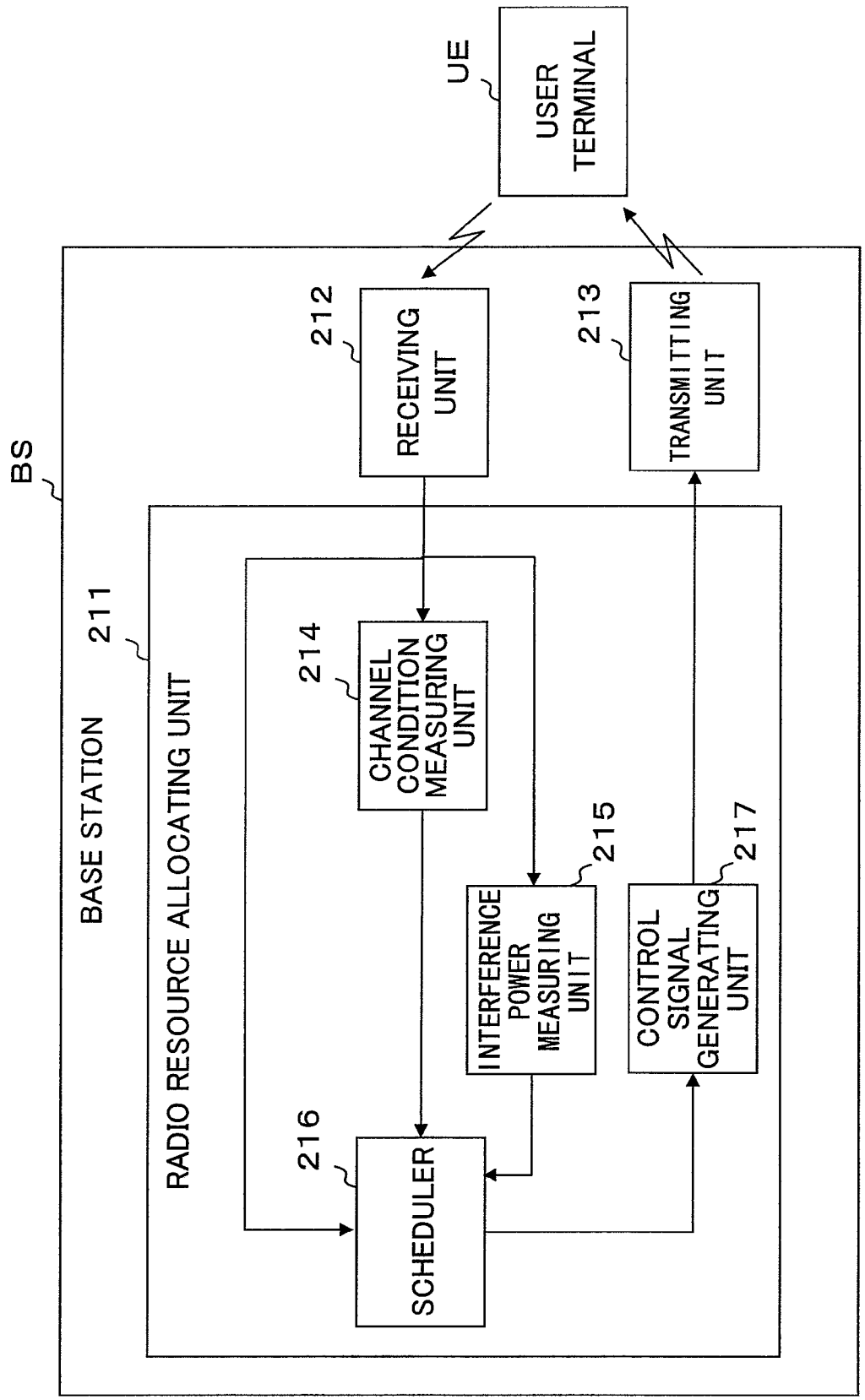
FIG. 15 shows an example structure of a base station in the example of FIG. 6 or 10.

FIG. 15 shows an example structure of a base station BS in the example of FIG. 6 or 10. The base station BS includes a radio resource allocating unit 211, a receiving unit 212, and a transmitting unit 213. The radio resource allocating unit 211 allocates radio resources. The receiving unit 212 receives signals from a user terminal UE. The transmitting unit 213 transmits signals to the user terminal UE. The radio resource allocating unit 211 includes a channel condition measuring unit 214, an interference power measuring unit 215, a scheduler 216, and a control signal generating unit 217. The channel condition measuring unit 214 measures a channel condition between the user terminal UE and the base station BS based on signals received by the receiving unit 212. The interference power measuring unit 215 measures interference power for each frequency band based on signals received by the receiving unit 212. The scheduler 216 schedules radio resources based on information (traffic information such as traffic type or the amount of data) retrieved by the receiving unit 212, the channel condition measured by the channel condition measuring unit 214, and the interference power measured by the interference power measuring unit 215. The control signal generating unit 217 generates a control signal regarding uplink radio resource allocation based on the result of scheduling in the scheduler 216 and supplies the control signal to the transmitting unit 213.

Figure 16:
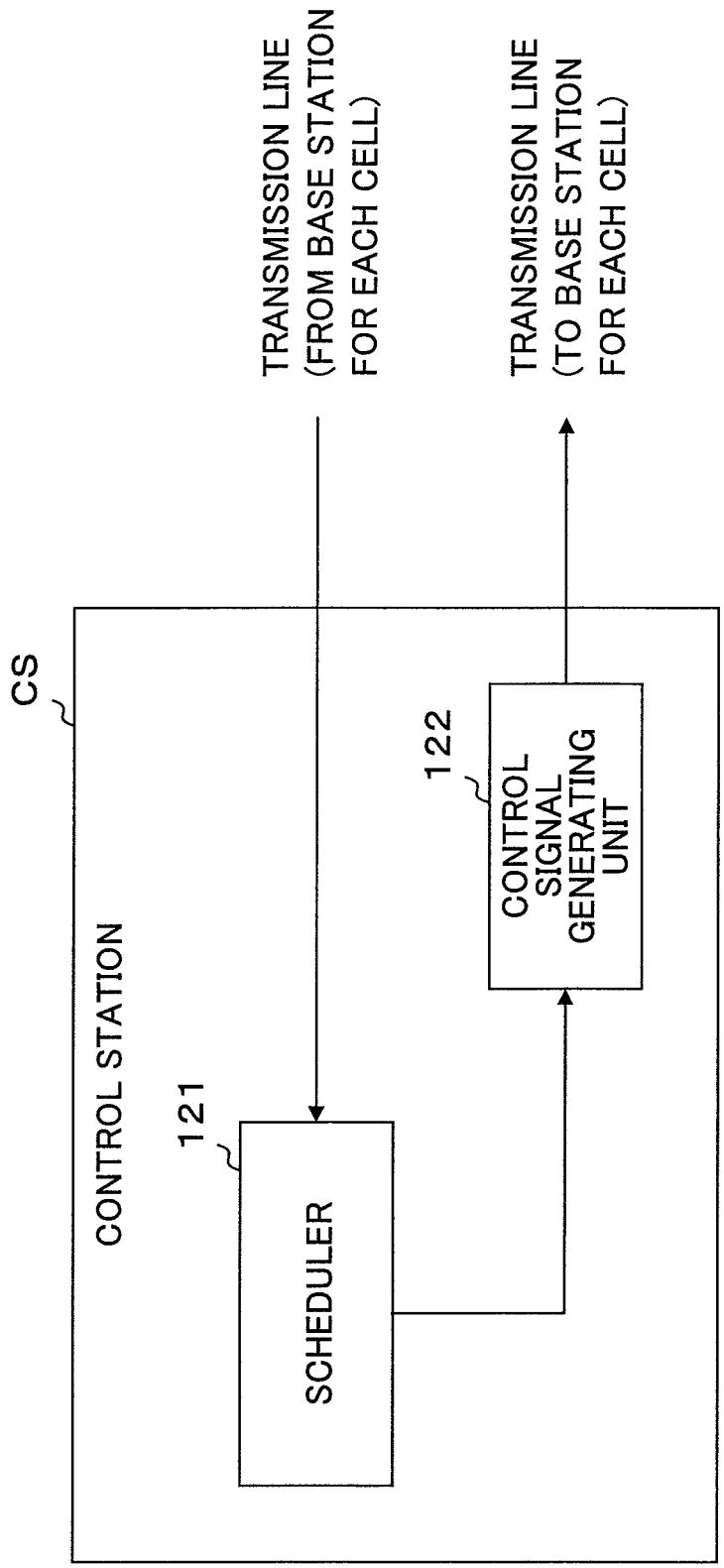
FIG. 16 shows an example structure of a control station for centrally allocating frequency bands in the example of FIG. 7 or 11.

FIG. 16 shows an example structure of a control station CS for centrally allocating frequency bands in the example of FIG. 7 or 11. The control station CS includes a scheduler 121 and a control signal generating unit 122. The scheduler 121 retrieves information about each cell, such as the amount of traffic, from a base station for each cell via a transmission line. The scheduler 121 also retrieves information about each user terminal, such as a channel condition, traffic type, the amount of data, or the like. Then, the scheduler 121 schedules radio resources. The control signal generating unit 122 generates a control signal based on the result of scheduling in the scheduler 121 and transmits the control signal to the base station for each cell via the transmission line.

Figure 17:
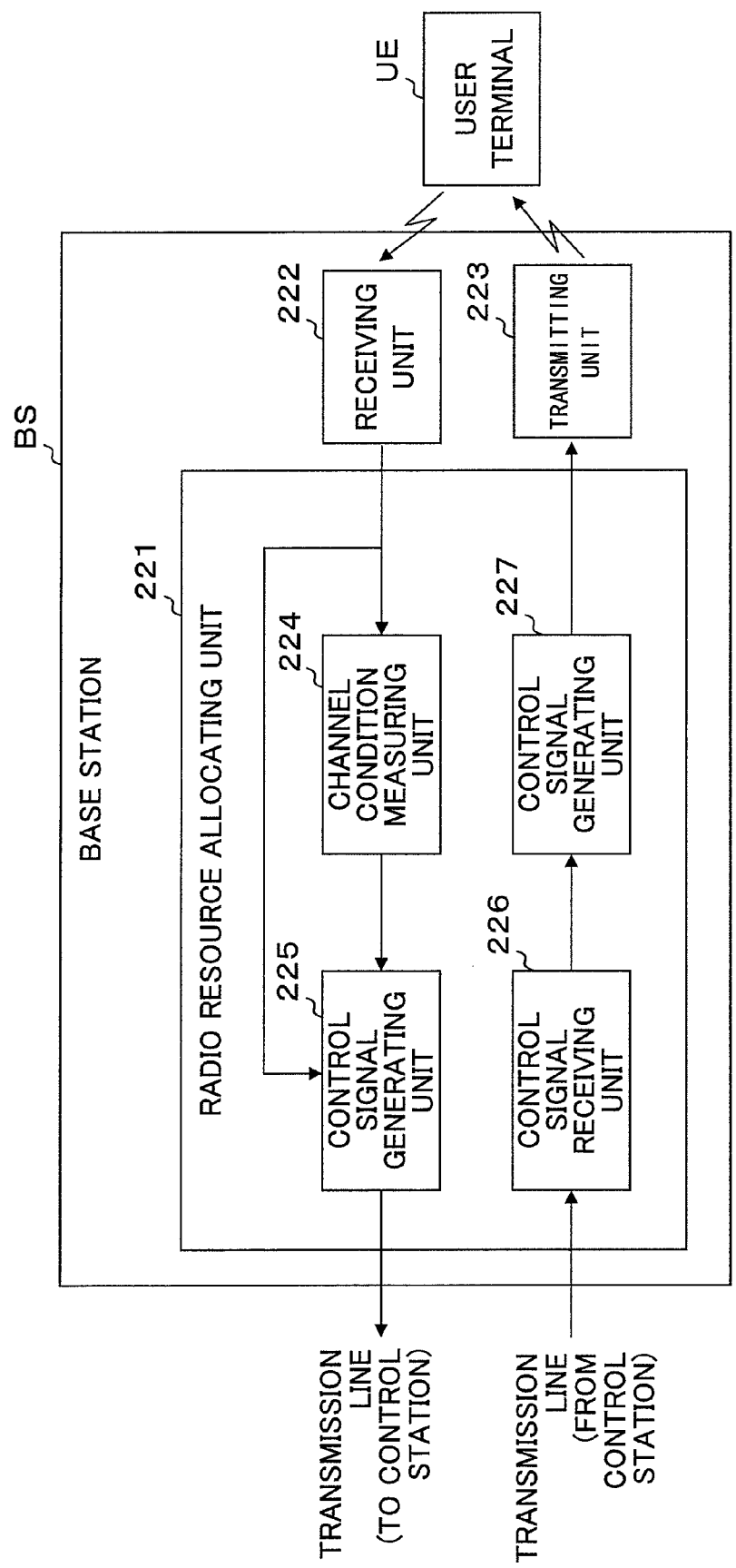
FIG. 17 shows an example structure of a base station in the example of FIG. 7 or 11.

FIG. 17 shows an example structure of a base station BS in the example of FIG. 7 or 11. The base station BS includes a radio resource allocating unit 221, a receiving unit 222, and a transmitting unit 223. The radio resource allocating unit 221 allocates radio resources. The receiving unit 222 receives signals from a user terminal UE. The transmitting unit 223 transmits signals to the user terminal UE. The radio resource allocating unit 221 includes a channel condition measuring unit 224, a control signal generating unit 225, a control signal receiving unit 226, and a control signal generating unit 227. The channel condition measuring unit 224 measures a channel condition between the user terminal UE and the base station BS based on signals received by the receiving unit 222. The control signal generating unit 225 generates a control signal based on traffic information such as traffic type or the amount of data retrieved by the receiving unit 222 and the channel condition measured by the channel condition measuring unit 224 and transmits the control signal to a control station via a transmission line. The control signal receiving unit 226 receives a control signal including uplink radio resource allocation information from the control station via the transmission line. The control signal generating unit 227 generates a control signal regarding uplink radio resource allocation based on the control signal received by the control signal receiving unit 226 and supplies the control signal to the transmitting unit 223.

Figure 18:
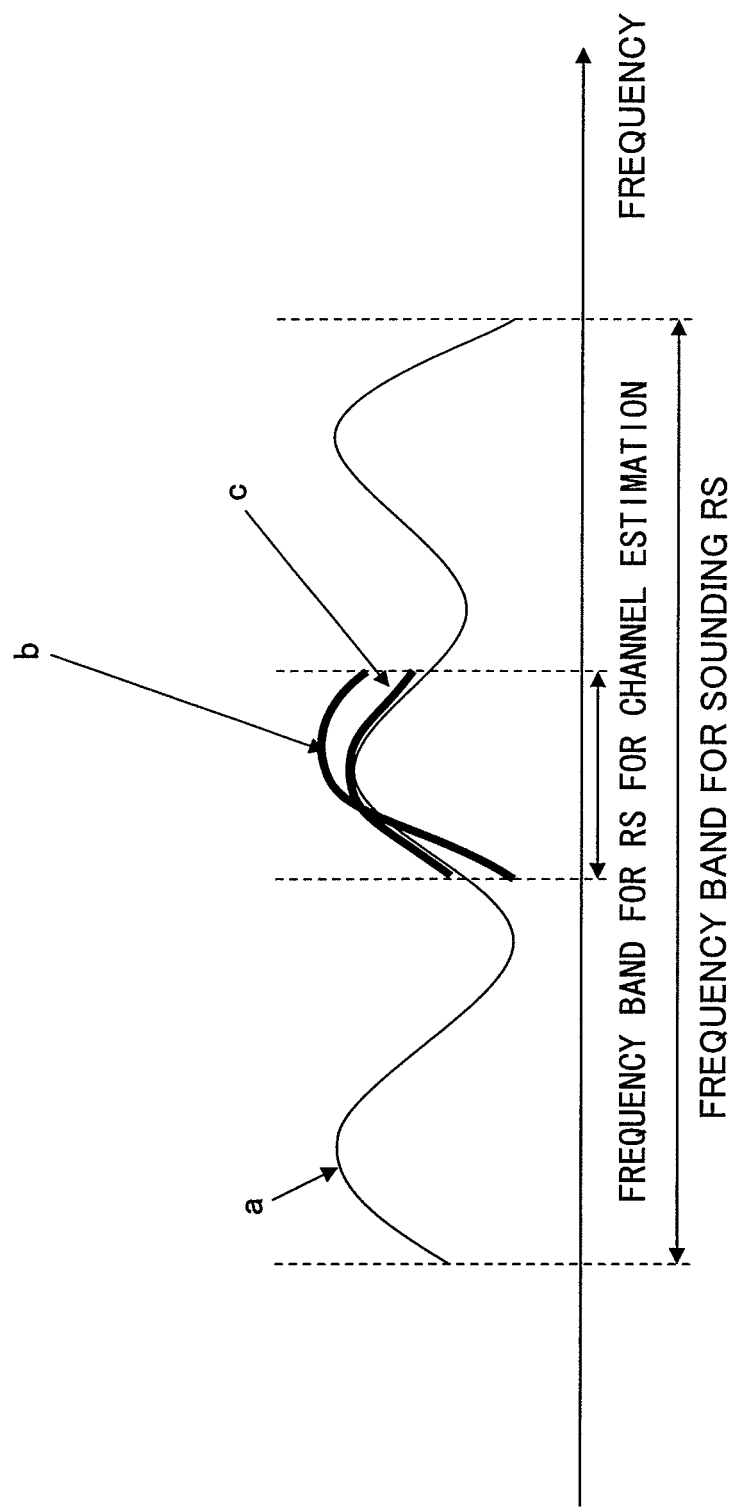
FIG. 18 shows differences between a channel response estimated by sounding RSs and a channel response estimated by RSs for channel estimation when the use of the same CAZAC sequence causes interference.

With reference to FIG. 18, a scheme for measuring other-cell interference in the example of FIG. 10 is described below, where frequency bands used in cells with the same CAZAC sequence within an interference area are semi-statically or dynamically selected based on measurement of other-cell interference without signaling.

FIG. 18 shows differences between a channel response estimated by sounding RSs and a channel response estimated by RSs for channel estimation when the use of the same CAZAC sequence causes interference. A curve (a) shows the channel response estimated by sounding RSs on the frequency axis. If interference due to the same CAZAC sequence does not occur, a curve (c) which shows the channel response estimated by RSs for channel estimation traces the curve (a). If interference due to the same CAZAC sequence occurs, however, a curve (b) deviates from the curve (a). Accordingly, measuring the difference (deviation) between the channel estimation value by means of wideband sounding RSs and the channel estimation value by means of RSs for channel estimation allows for estimating (measuring) frequency bands which are expected to be used in other cells to which the same CAZAC sequence is assigned.

[Approach for Autonomously Changing to Another CAZAC Sequence which does not Cause Interference, Upon Detecting Interference from Other Cells to which the Same CAZAC is Assigned]

This approach measures other-cell interference (interference power) for each frequency band which is caused by the use of the same CAZAC sequence in the example of FIG. 10. When a frequency band is detected which is expected to be used in other cells to which the same CAZAC sequence is assigned, this approach changes to another CAZAC sequence for the frequency band. This approach may measure interference as described with reference to FIG. 18.

A structure for implementing this approach is configured as shown in FIG. 15. The scheduler 216 performs scheduling of radio resources, including the change to another CAZAC sequence, based on information (traffic information such as traffic type or the amount of data) retrieved by the receiving unit 212, the channel condition measured by the channel condition measuring unit 214, and the interference power measured by the interference power measuring unit 215.

[Approach for Randomly Determining a Frequency Band or the Like Used by User Terminals to which a CAZAC Sequence with a Predetermined Sequence Length is Assigned in Each Cell within an Interference Area]

This approach reduces the probability of collision by means of randomizing, while accepting collision among RSs to some extent.

Figure 19:
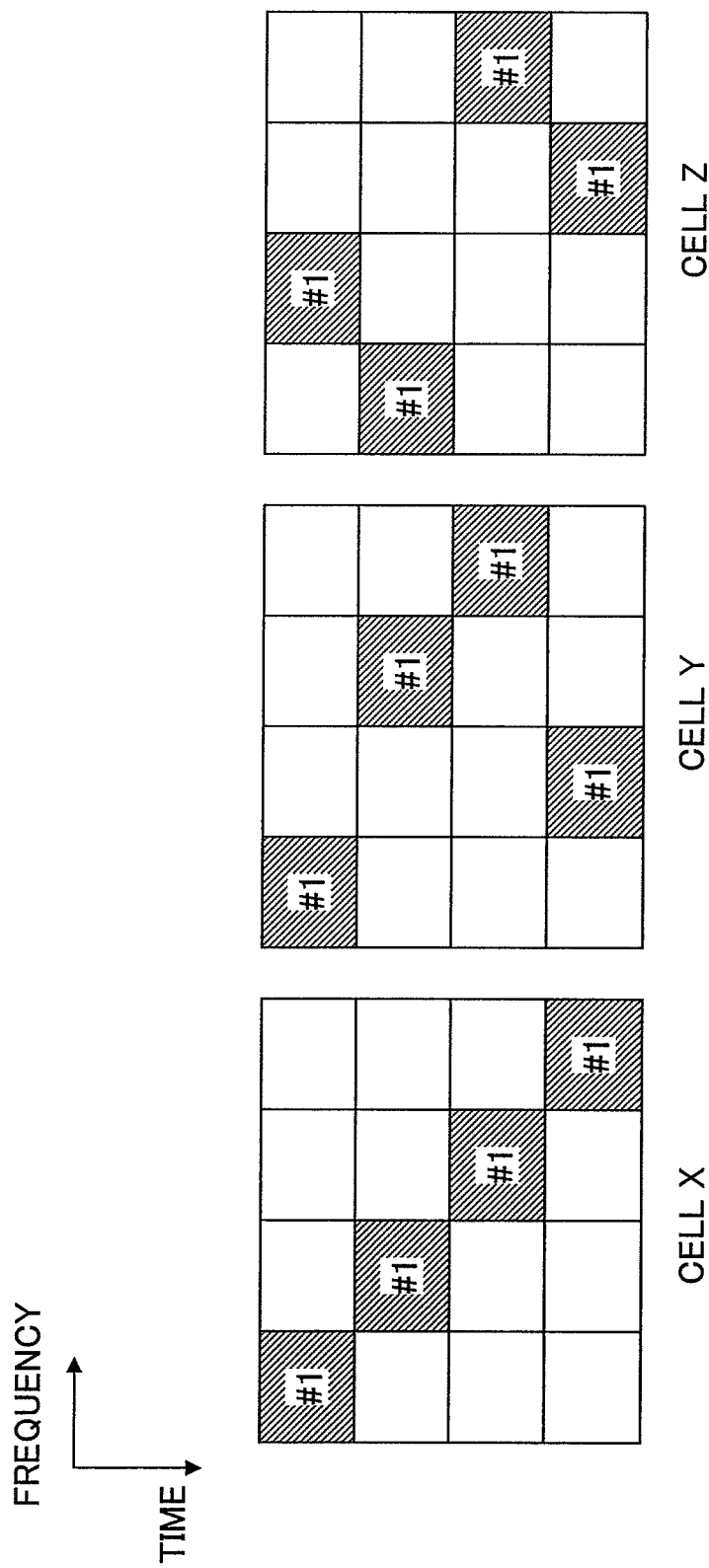
FIG. 19 shows example patterns for randomizing collision by the hopping of frequency bands.

FIG. 19 shows example patterns for randomizing collision by the hopping of frequency bands. Collision among signals with the same CAZAC sequence is randomized in cells X, Y, and Z with the same CAZAC sequence, by the hopping of frequency bands used by user terminals to which the CAZAC sequence with the predetermined sequence length is assigned in each cell. It should be noted that the pattern for the hopping of frequency bands may be randomly determined or may be determined in advance to achieve orthogonalization among cells.

Figure 20:
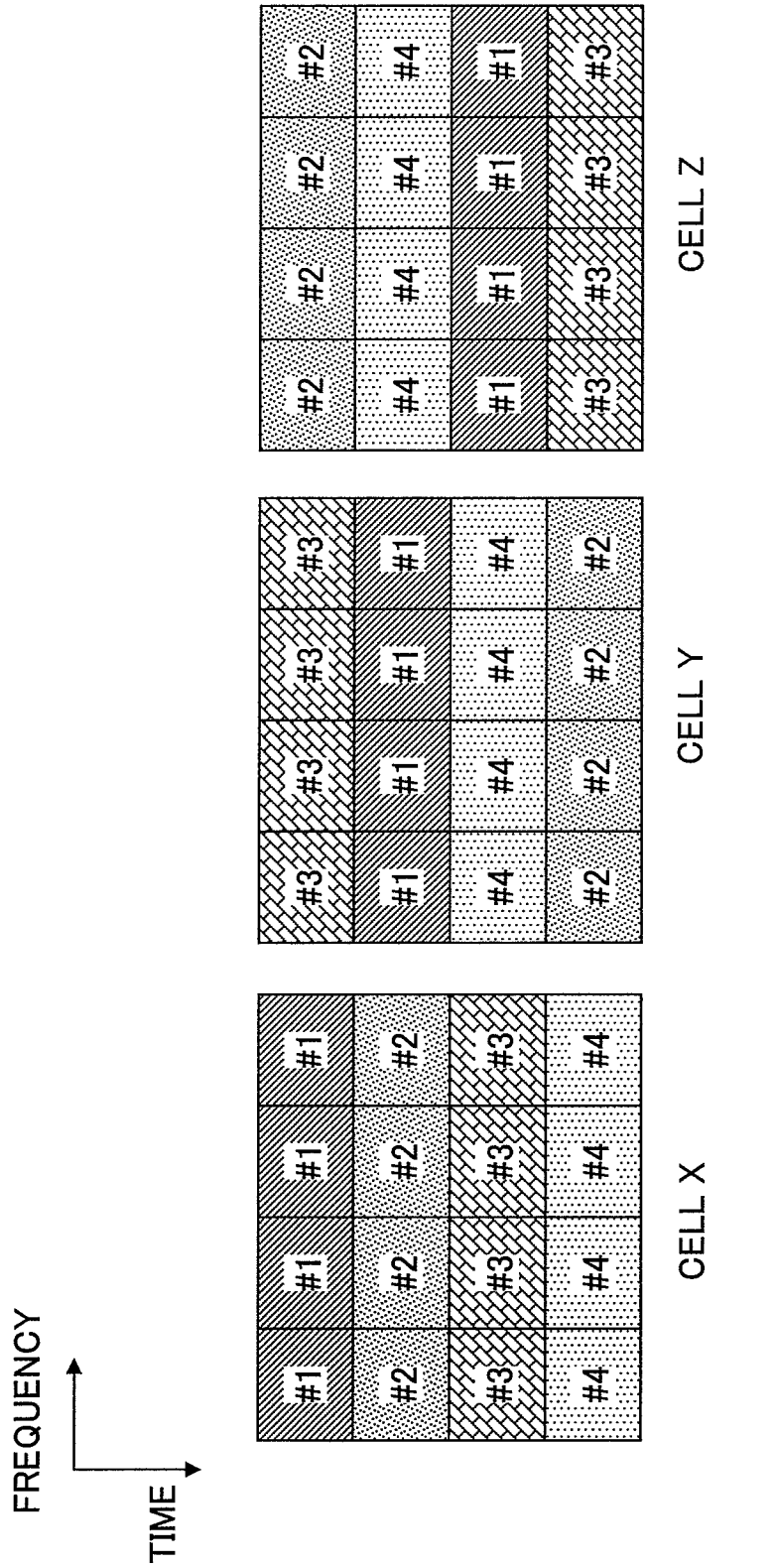
FIG. 20 shows example patterns for randomizing collision by changing CAZAC sequences at each radio subframe.

FIG. 20 shows example patterns for randomizing collision by changing CAZAC sequences at each radio subframe. Collision among signals with the same CAZAC sequence is randomized in cells X, Y, and Z, by changing, at each radio subframe, CAZAC sequences used by user terminals to which the CAZAC sequence with the predetermined sequence length is assigned. It should be noted that the pattern for changing CAZAC sequences may be randomly determined or may be determined in advance to achieve orthogonalization among cells.

Figure 21:
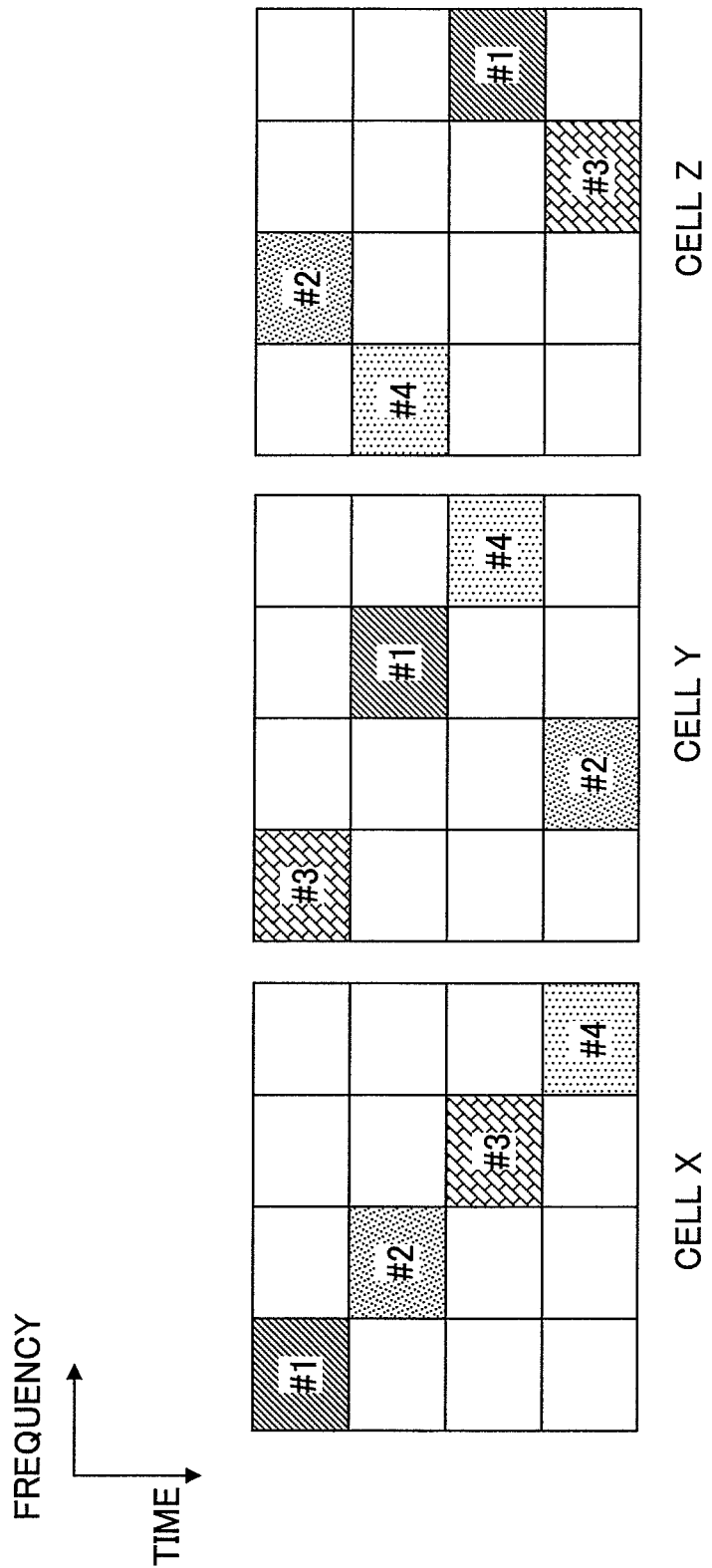
FIG. 21 shows example patterns for randomizing collision both by the hopping of frequency bands and by changing CAZAC sequences at each radio frame.

FIG. 21 shows example patterns for randomizing collision both by the hopping of frequency bands and by changing CAZAC sequences at each radio frame. Collision among signals with the same CAZAC sequence is randomized, both by the random hopping of frequency bands used by user terminals to which the CAZAC sequence with the predetermined sequence length is assigned in each cell and by changing CAZAC sequences at each radio subframe. It should be noted that the pattern for the hopping of frequency bands and changing CAZAC sequences may be randomly determined or may be determined in advance to achieve orthogonalization among cells.

Structures for implementing this approach are described below.

Figure 22:
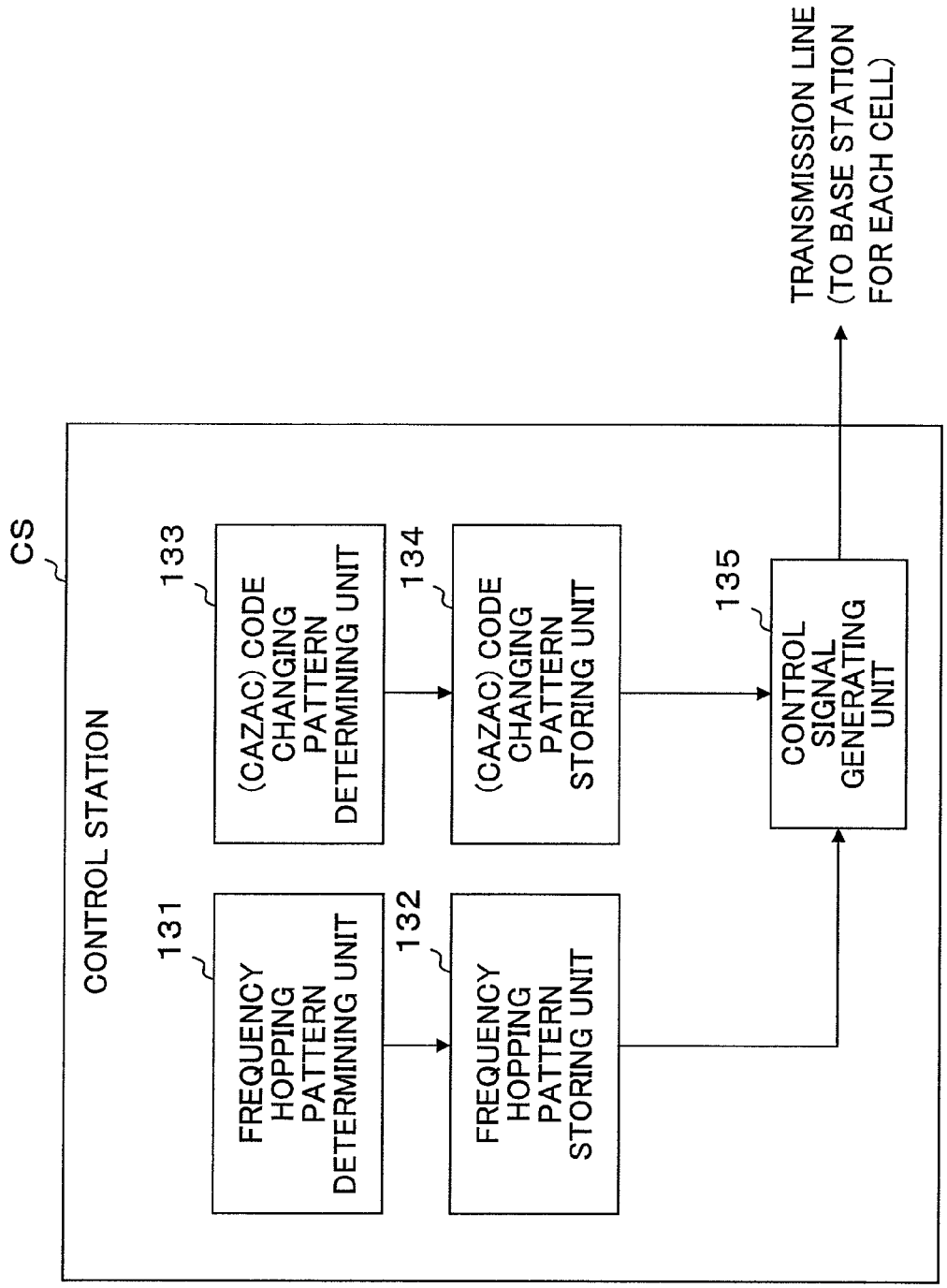
FIG. 22 shows an example structure of a control station in the example of FIG. 19, 20, or 21.

FIG. 22 shows an example structure of a control station CS in the example of FIG. 19, 20, or 21. The control station CS includes a frequency hopping pattern determining unit 131, a frequency hopping pattern storing unit 132, a code changing pattern determining unit 133, a code changing pattern storing unit 134, and a control signal generating unit 135. The frequency hopping pattern determining unit 131 determines a pattern for the hopping of frequency bands. The frequency hopping pattern storing unit 132 stores the pattern for the hopping of frequency bands determined by the frequency hopping pattern determining unit 131. The code changing pattern determining unit 133 determines a pattern for changing CAZAC sequences. The code changing pattern storing unit 134 stores the pattern for changing CAZAC sequences determined by the code changing pattern determining unit 133. The control signal generating unit 135 generates a control signal based on the patterns stored in the frequency hopping pattern storing unit 132 and the code changing pattern storing unit 134 and transmits the control signal to a base station for each cell via a transmission line.

Figure 23:
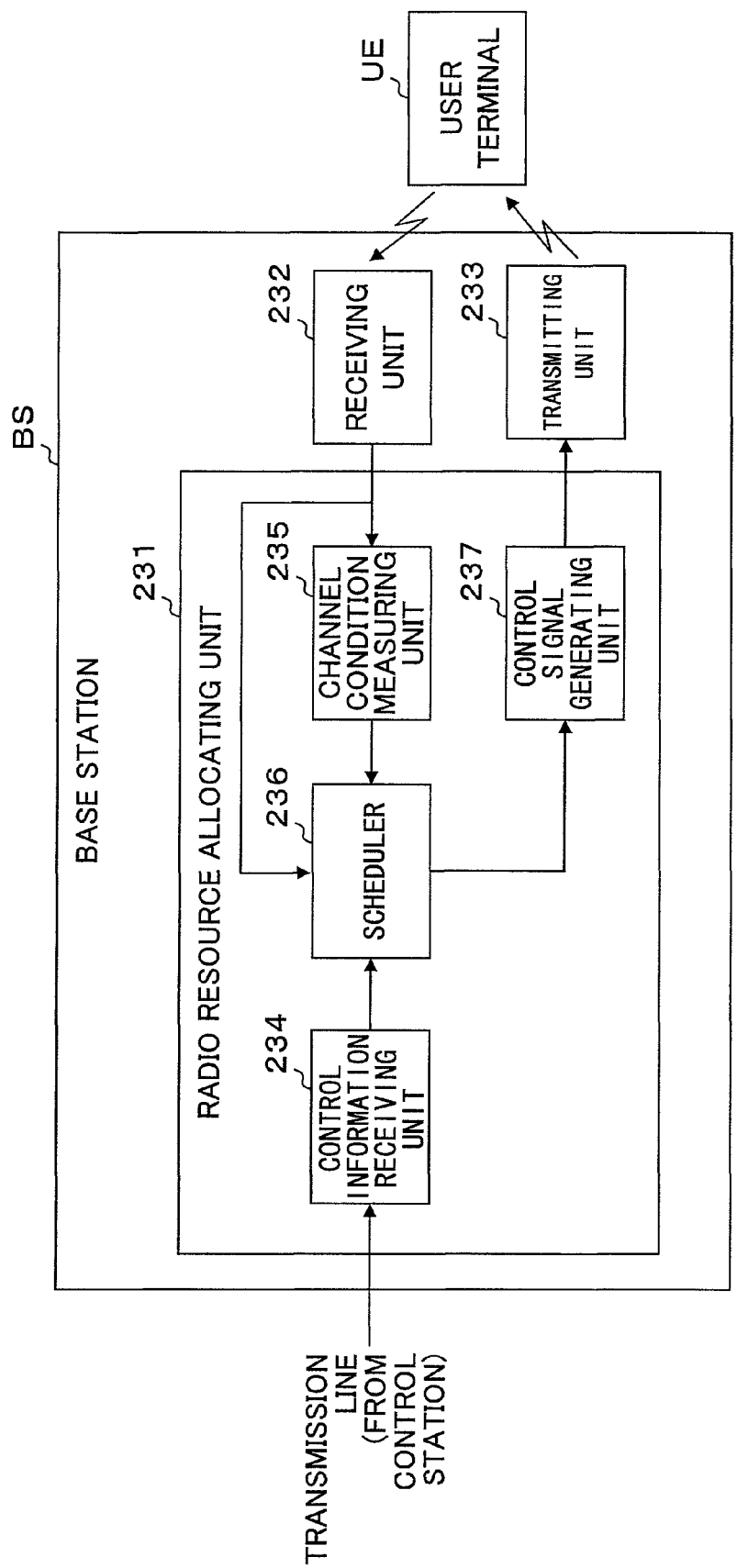
FIG. 23 shows an example structure of a base station in the example of FIG. 19, 20, or 21.

FIG. 23 shows an example structure of a base station BS in the example of FIG. 19, 20, or 21. The base station BS includes a radio resource allocating unit 231, a receiving unit 232, and a transmitting unit 233. The radio resource allocating unit 231 receives a control signal from a control station via a transmission line and allocates radio resources. The receiving unit 232 receives signals from a user terminal UE. The transmitting unit 233 transmits signals to the user terminal UE. The radio resource allocating unit 231 includes a control information receiving unit 234, a channel condition measuring unit 235, a scheduler 236, and a control signal generating unit 237. The control information receiving unit 234 receives the control signal (pattern for the hopping of frequency bands and pattern for changing codes or CAZAC sequences) from the control station via the transmission line. The channel condition measuring unit 235 measures a channel condition between the user terminal UE and the base station BS based on signals received by the receiving unit 232. The scheduler 236 schedules radio resources based on the control signal received by the control information receiving unit 234, information (traffic information such as traffic type or the amount of data) retrieved by the receiving unit 232, and the channel condition measured by the channel condition measuring unit 235. The control signal generating unit 237 generates a control signal regarding uplink radio resource allocation based on the result of scheduling in the scheduler 236 and supplies the control signal to the transmitting unit 233.

Figure 24:
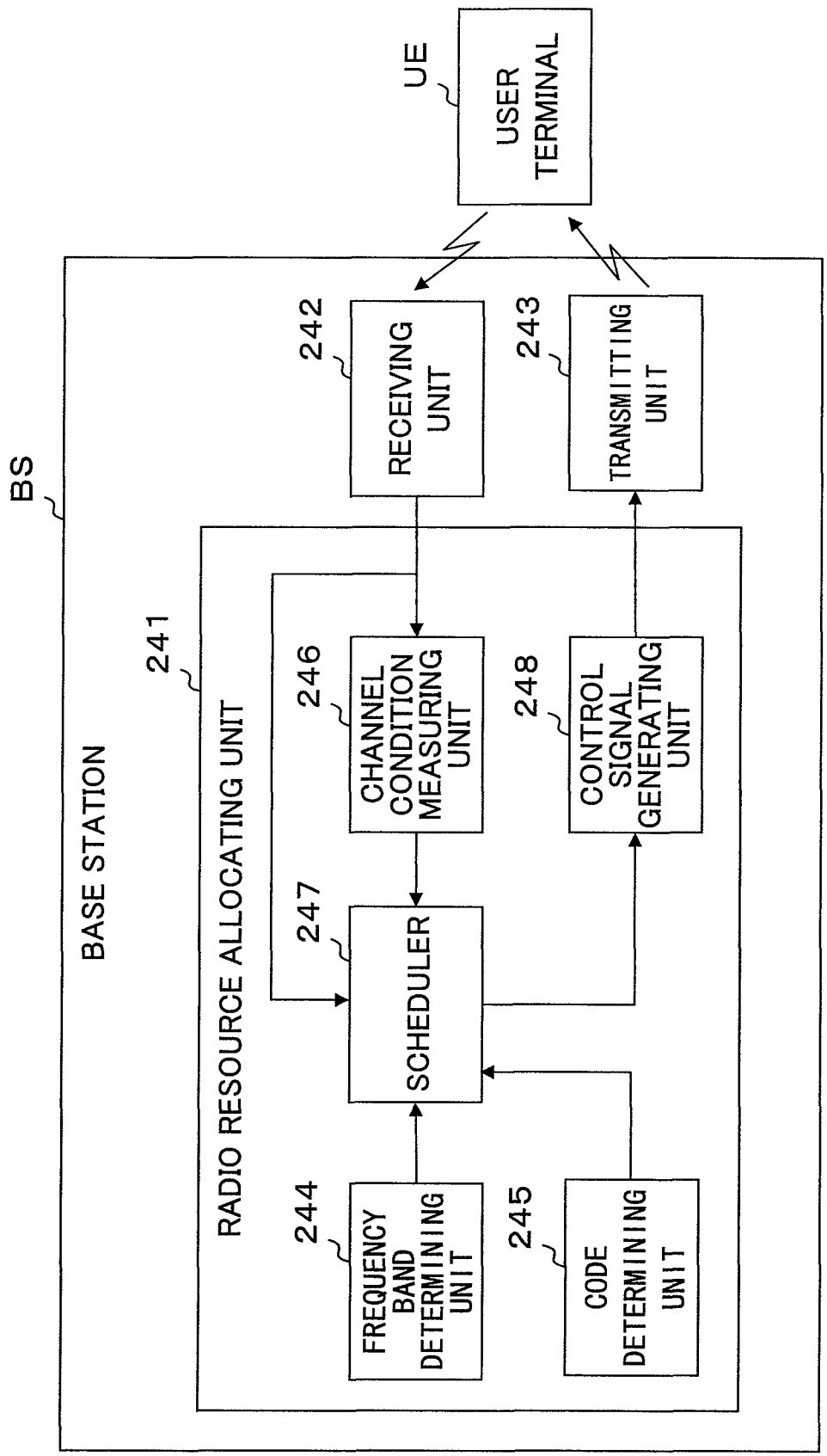
FIG. 24 shows another example structure of a base station in the example of FIG. 19, 20, or 21.

FIG. 24 shows another example structure of a base station BS in the example of FIG. 19, 20, or 21. The base station BS autonomously controls frequency bands and CAZAC sequences without a control station. The base station BS includes a radio resource allocating unit 241, a receiving unit 242, and a transmitting unit 243. The radio resource allocating unit 241 allocates radio resources. The receiving unit 242 receives signals from a user terminal UE. The transmitting unit 243 transmits signals to the user terminal UE. The radio resource allocating unit 241 includes a frequency band determining unit 244, a code determining unit 245, a channel condition measuring unit 246, a scheduler 247, and a control signal generating unit 248. The frequency band determining unit 244 determines a frequency band to be used. The code determining unit 245 determines a CAZAC sequence to be used. The channel condition measuring unit 246 measures a channel condition between the user terminal UE and the base station BS based on signals received by the receiving unit 242. The scheduler 247 schedules radio resources based on the frequency band determined by the frequency band determining unit 244, the CAZAC sequence determined by the code determining unit 245, information (traffic information such as traffic type or the amount of data) retrieved by the receiving unit 242, and the channel condition measured by the channel condition measuring unit 246. The control signal generating unit 248 generates a control signal regarding uplink radio resource allocation based on the result of scheduling in the scheduler 247 and supplies the control signal to the transmitting unit 248.

[Approach for Shifting Transmission Timings of Radio Subframes in Each Cell within an Interference Area]

Figure 25:
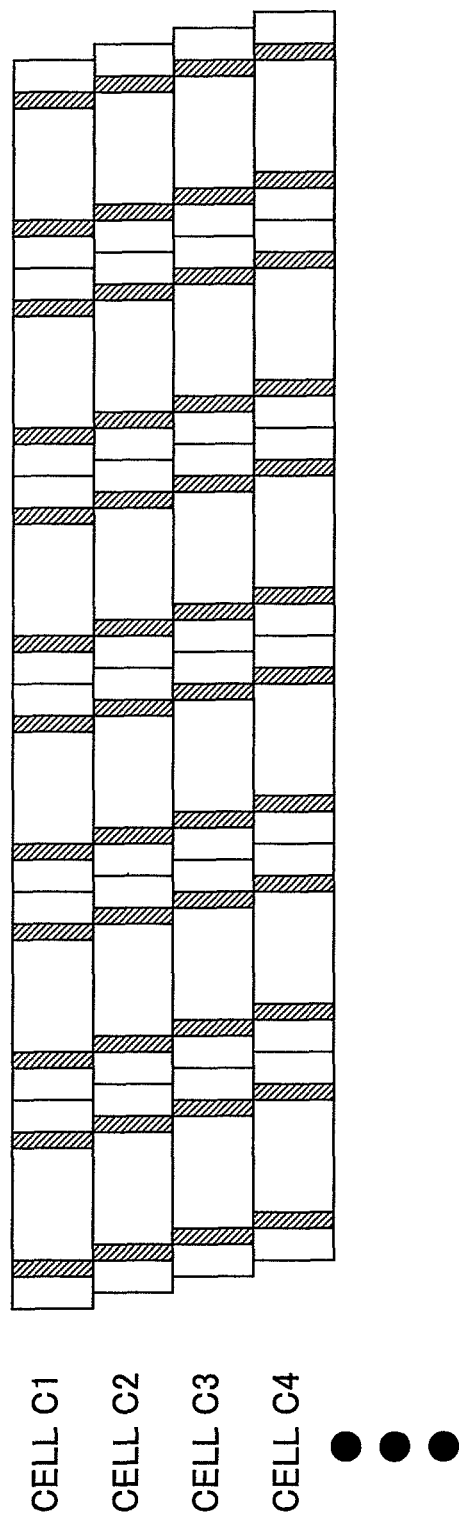
FIG. 25 shows an example of avoiding collision among RSs by shifting transmission timings of radio subframes.

FIG. 25 shows an example of avoiding collision among RSs by shifting transmission timings of radio subframes. Collision among RSs can be avoided by shifting transmission timings (radio subframe timings) in cells C1, C2, . . . to which the same CAZAC sequence is assigned. This approach is typically used at start-up of each base station and is not used for shifting transmission timings during operating conditions.

Figure 26:
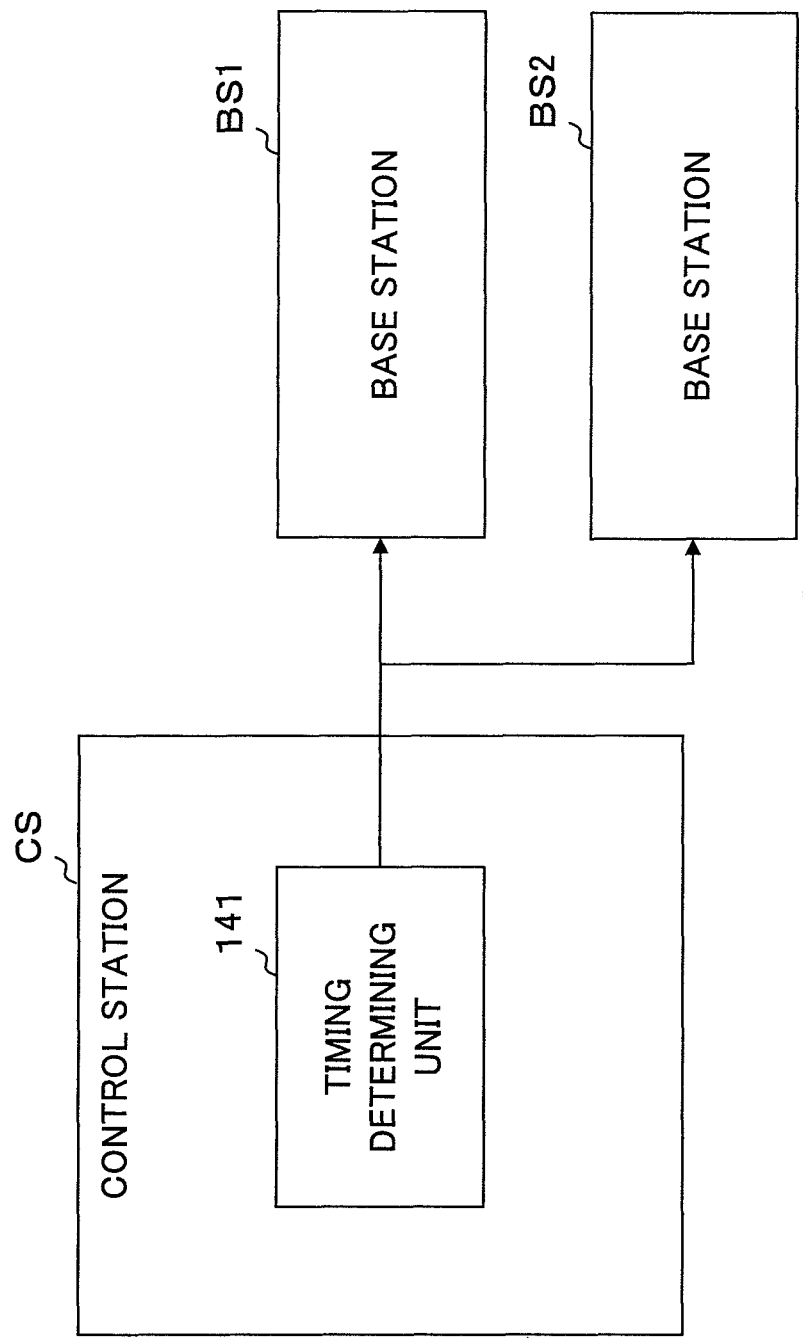
FIG. 26 shows an example structure of a control station and base stations in the example of FIG. 25.

FIG. 26 shows an example structure of a control station CS and base stations BS1 and BS2 in the example of FIG. 25. The control station CS includes a timing determining unit 141. The timing determining unit 141 shifts transmission timings for each base station BS1, BS2, . . . .

With reference to FIGS. 27 and 28, a scheme for shifting transmission timings during operating conditions is described below. FIG. 27 shows results of detecting reception timings of RSs transmitted from other base stations. Each base station controls transmission timings for user terminals within its own cell so as to synchronize reception timings of RSs from the user terminals. In this manner, each base station achieves orthogonalization among RSs with the same CAZAC sequence which are received from user terminals within its own cell. In FIG. 27, interference (collision) among RSs does not occur, since all the reception timings of RSs received from user terminals within its own cell are different from the reception timings of RSs received from user terminals within other cells.

Even though each base station shifts transmission timings in advance so as to avoid collision among RSs, collision among RSs may occur because of movement of user terminals or the like. For example, when the user terminal E moves as shown in FIG. 28, the base station for the cell C3 controls transmission timings so as to synchronize reception timings of RSs from the user terminals E and F. On the other hand, the base stations for the cells C1 and C2 do not control the transmission timing for the user terminal E. Consequently, interference may occur with RSs from user terminal E. FIG. 28 shows that interference occurs in the cell C1.

In this case, each base station instructs user terminals within its own cell to shift transmission timings. The transmission timings are determined so as to either prevent reception timings of RSs from overlapping one another or minimize collision. Autonomously controlling transmission timings in each base station in this manner can reduce interference during operating conditions.

When each base station autonomously controls transmission timings, interference may occur in another cell C2 as a result of shifting transmission timings in one cell C1. Similarly, as a result of shifting transmission timings in the cell C2, interference may occur in the cell C1 again. In order to avoid this situation, base stations which use the same CAZAC sequence may change information with one another and control transmission timings so as to either prevent reception timings of RSs from overlapping one another or minimize collision.

When each base station shifts transmission timings, the transmission timings are preferably controlled within the range that does not cause control delay regarding Hybrid ARQ (Automatic Repeat request), AMC (Adaptive Modulation and Coding), or the like. Control information about transmission timings for avoiding interference from other cells may be generated using control bits used for synchronizing reception timings of uplink signals in the cell.

Figure 29:
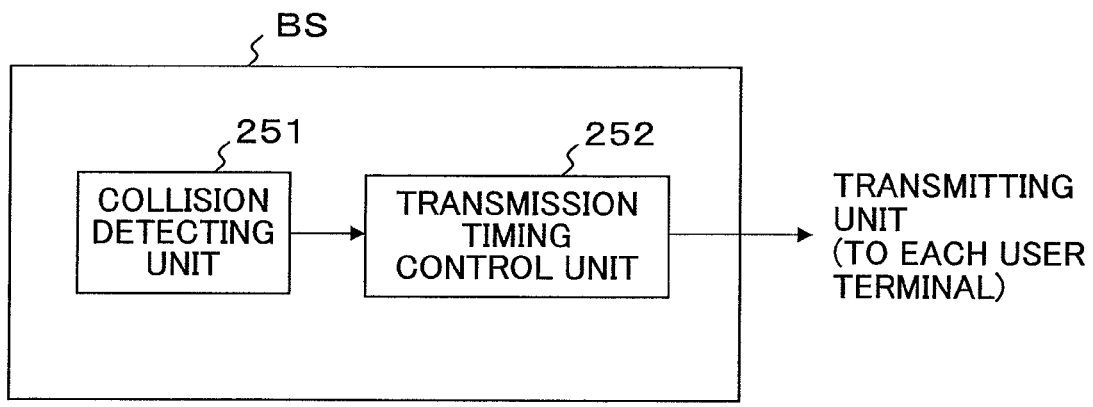
FIG. 29 shows an example structure of a base station for autonomously controlling transmission timings in the example of FIG. 28.

FIG. 29 shows an example structure of a base station BS for autonomously controlling transmission timings. The base station BS includes a collision detecting unit 251 and a transmission timing control unit 252. The collision detecting unit 251 detects collision between RSs from user terminals within its own cell and RSs from user terminals within other cells. When collision is detected, the transmission timing control unit 252 controls transmission timings so as to either prevent reception timings of RSs from overlapping one another or minimize collision.

Figure 30:
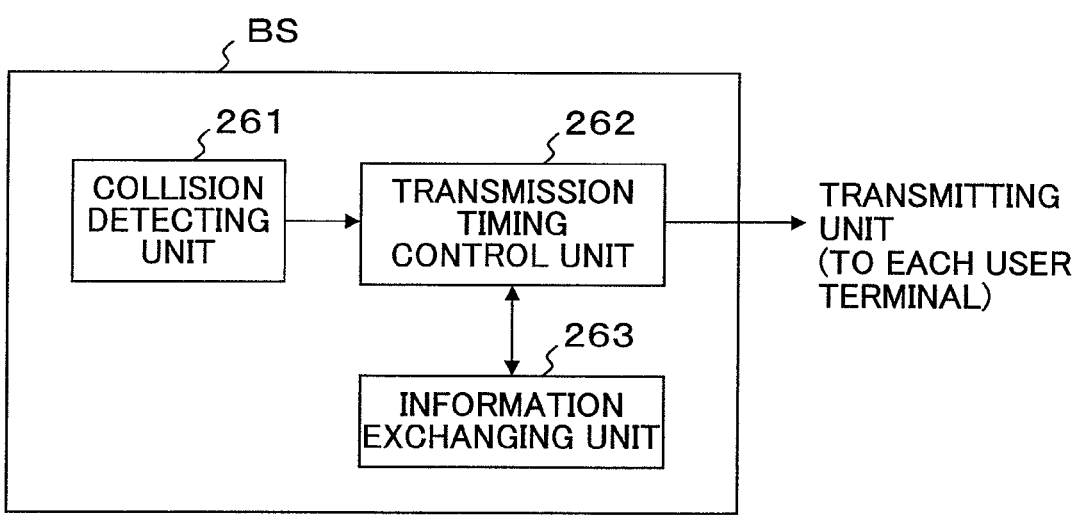
FIG. 30 shows an example structure of a base station for exchange information with other base stations to control transmission timings in the example of FIG. 28.

FIG. 30 shows an example structure of a base station BS for exchange information with other base stations to control transmission timings. The base station BS includes a collision detecting unit 261, a transmission timing control unit 262, and an information exchanging unit 263. The collision detecting unit 261 detects collision between RSs from user terminals within its own cell and RSs from user terminals within other cells. When collision is detected, the transmission timing control unit 262 controls transmission timings so as to either prevent reception timings of RSs from overlapping one another or minimize collision. The information exchanging unit 263 transmits the controlled transmission timings to other base stations with the same CAZAC sequence. On the other hand, when the information exchanging unit 263 receives information that transmission timings are controlled within other cells, the transmission timing control unit 262 determines whether collision occurs within its own cell and controls transmission timings if collision occurs. In order to prevent each base station from unlimitedly exchanging information about transmission timings, priorities may be provided in base stations. Specifically, a base station with a higher priority is given priority for controlling transmission timings and transmits the controlled transmission timings to base stations with lower priorities.

The aforementioned embodiments may be combined as necessary. The combination of embodiments can further reduce the probability of interference.

SUMMARY

According to the embodiments of the present invention, a mobile communication system in which a finite number of CAZAC sequences used for uplink channel estimation or the like are reused among multiple cells can avoid collision among RSs and prevent communication quality from being degraded, even though the number of CAZAC sequences is small, by any of the following approaches:

(1) an approach for determining a frequency band used by user terminals to which a CAZAC sequence with a predetermined sequence length is assigned in each cell within an interference area, wherein the frequency band is determined to be different from frequency bands used in other cells;

(2) an approach for autonomously changing to another CAZAC sequence which does not cause interference, upon detecting interference from other cells to which the same CAZAC sequence is assigned;

(3) an approach for randomly determining a frequency band or a CAZAC sequence used by user terminals to which a CAZAC sequence with a predetermined sequence length is assigned in each cell within an interference area; and (4) an approach for shifting transmission timings of radio subframes in each cell within an interference area.

There have been shown and described what are considered to be preferred embodiments of the present invention. Various modifications and changes could be made to the aforementioned embodiments, without departing from the scope of the present invention as claimed in the Claims. It is therefore intended that the present invention not be limited to the detailed description and the accompanying drawings.

This international patent application is based on Japanese Priority Applications No. 2006-169459 filed on Jun. 19, 2006 and No. 2006-272342 filed on Oct. 3, 2006, the entire contents of which are incorporated herein by reference.

What is claimed is:

1. A mobile communication system in which a finite number of reference signal sequences are reused among multiple cells, comprising a base station:
   the base station comprising:
   a measuring unit configured to measure interference power for each frequency band from another cell to which the same reference signal sequence is assigned by measuring a difference between a channel estimation value by means of sounding reference signals and a channel estimation value by means of reference signals for channel estimation; and
   a determining unit configured to determine a frequency band based on the measured interference power.

2. The mobile communication system as claimed in claim 1, wherein:
   the determining unit determines that the frequency band to be used is different from a frequency band in which interference is detected.

3. The mobile communication system as claimed in claim 1, wherein:
   the determining unit dynamically determines the frequency band at each subframe.

4. The mobile communication system in which a finite number of reference signal sequences used for uplink channel estimation or the like are reused among multiple cells, comprising as claimed in claim 1, wherein:
   the base station further comprises a shifting unit configured to shift transmission timings of radio subframes in each of the cells within an interference area.

5. The mobile communication system as claimed in claim 4, wherein:
   the base station further comprises a detecting unit configured to detect collision between a reception timing of a reference signal within an own-cell and a reception timing of another reference signal received from another cell;
   wherein the shifting unit shifts the transmission timings when the collision is detected.

6. The mobile communication system as claimed in claim 5, wherein:
   the base station further comprises a transmitting unit configured to transmit information about the shifted transmission timings to the other cell.

7. The mobile communication system as claimed in claim 5, wherein:
   the shifting unit shifts the transmission timings in consideration of control delay when the collision is detected.

8. The mobile communication system as claimed in claim 5, wherein:
   information about the shifted transmission timings is included in control bits used for synchronizing reception timings of uplink signals from user terminals in the cell.

* * * * *